United States Patent [19]

Asmundsson et al.

[11] 4,021,774
[45] May 3, 1977

[54] BOREHOLE SENSOR

[75] Inventors: Einar Asmundsson, Middle Haddam; Donald S. Grosso, West Hartford, both of Conn.

[73] Assignee: Teleco Inc., Middletown, Conn.

[22] Filed: June 23, 1976

[21] Appl. No.: 699,037

Related U.S. Application Data

[63] Continuation of Ser. No. 576,627, May 12, 1975, abandoned.

[52] U.S. Cl. .................. 340/18 R; 340/15.5 BH; 33/304; 33/313; 175/45; 340/18 NC
[51] Int. Cl.² .................. G01V 1/40; G01C 9/14; E21B 47/22
[58] Field of Search ..... 340/15.5 BH, 18 R, 18 NC; 250/266; 33/304, 310, 313; 73/151; 181/104; 175/45

[56] References Cited

UNITED STATES PATENTS

| | | | |
|---|---|---|---|
| 3,587,175 | 6/1971 | Armistead | 33/313 |
| 3,587,176 | 6/1971 | Schwerk | 33/313 |
| 3,771,118 | 11/1973 | Lichte et al. | 340/18 R |
| 3,791,043 | 2/1974 | Russell | 33/313 |
| 3,896,412 | 7/1975 | Rohr | 340/15.5 BH |

*Primary Examiner*—Nelson Moskowitz

[57] ABSTRACT

A borehole sensor is presented including a three axis gimbal device for determining (1) a vertical plane, using the force of gravity as a reference, (2) a horizontal plane, using the force of gravity as a reference, and (3) the north direction, using the earth's magnetic field as a reference. A motor drive system drives parts of the mechanism to desired positions about the three axes, and error transducers determine the deviation from desired positions about the axes and provide feedback to the motor drive system to eliminate the error.

112 Claims, 25 Drawing Figures

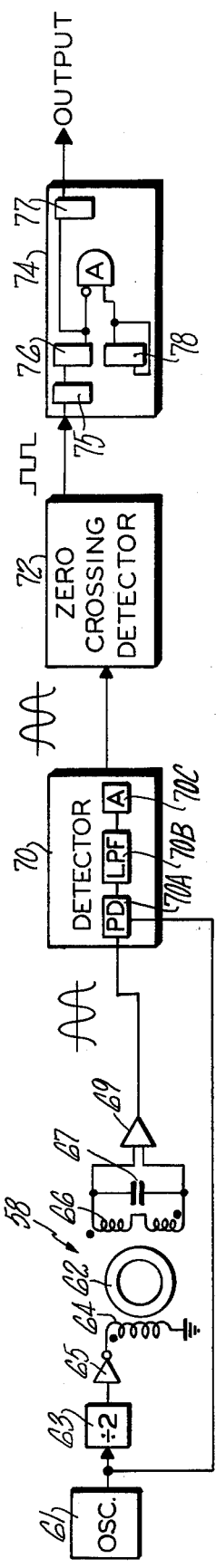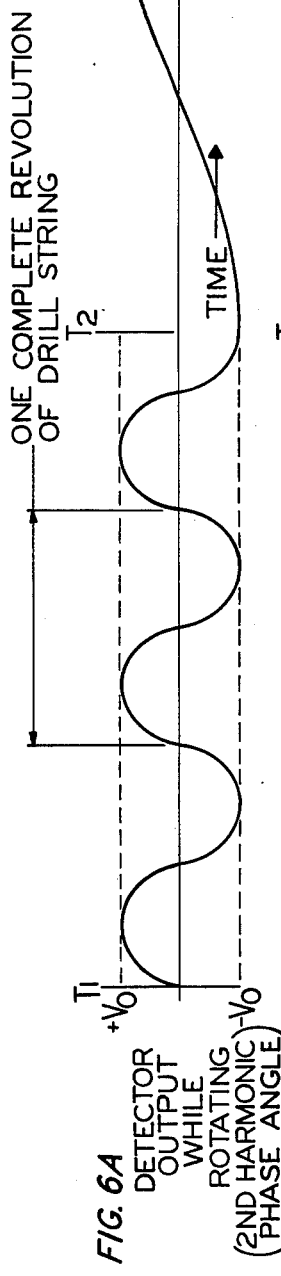

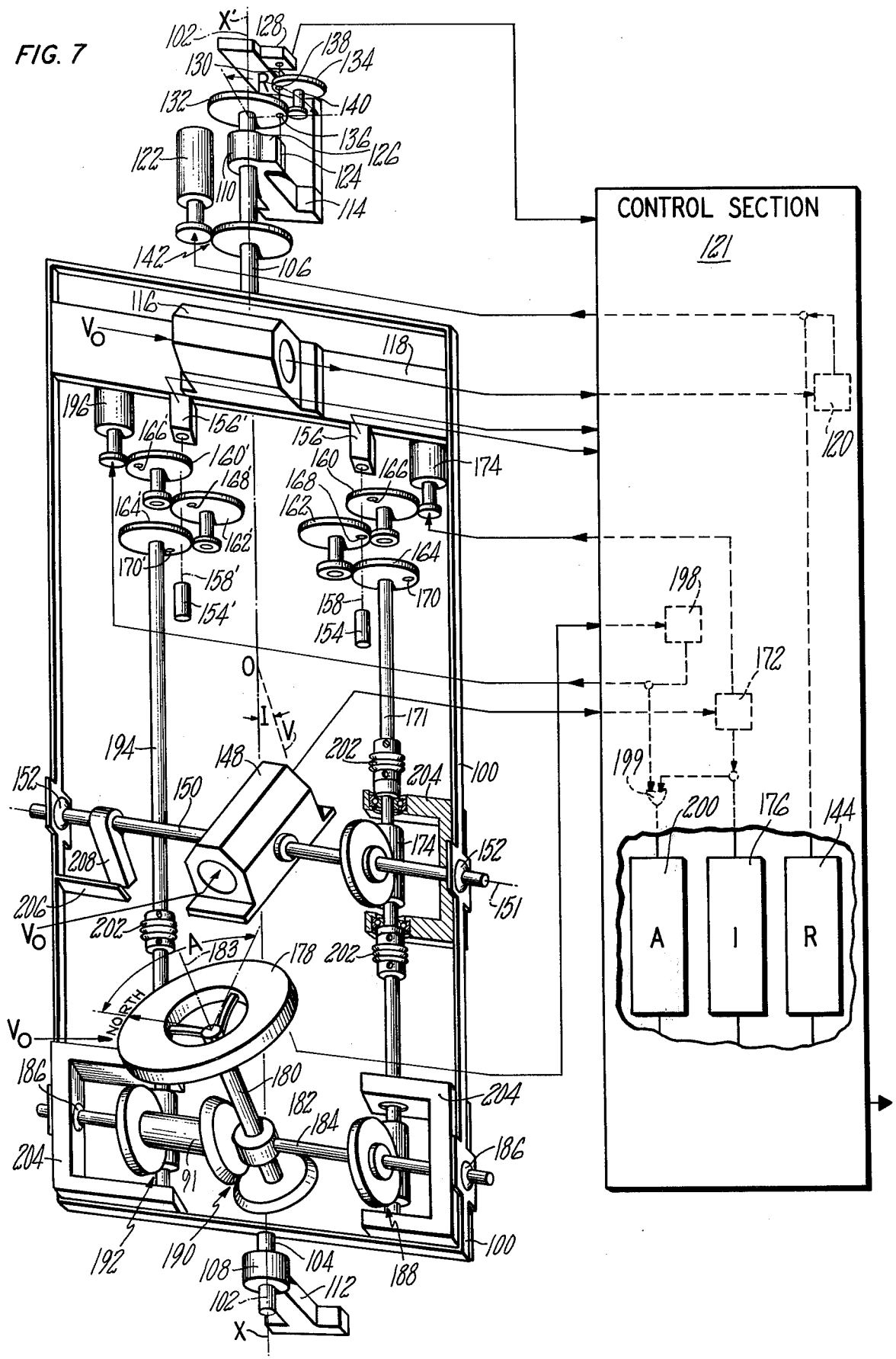

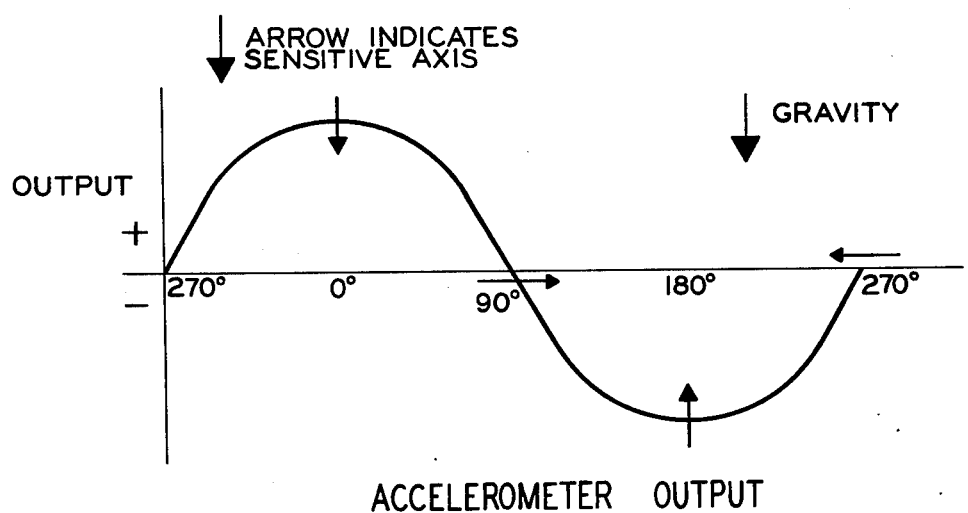
FIG. 8 ACCELEROMETER OUTPUT
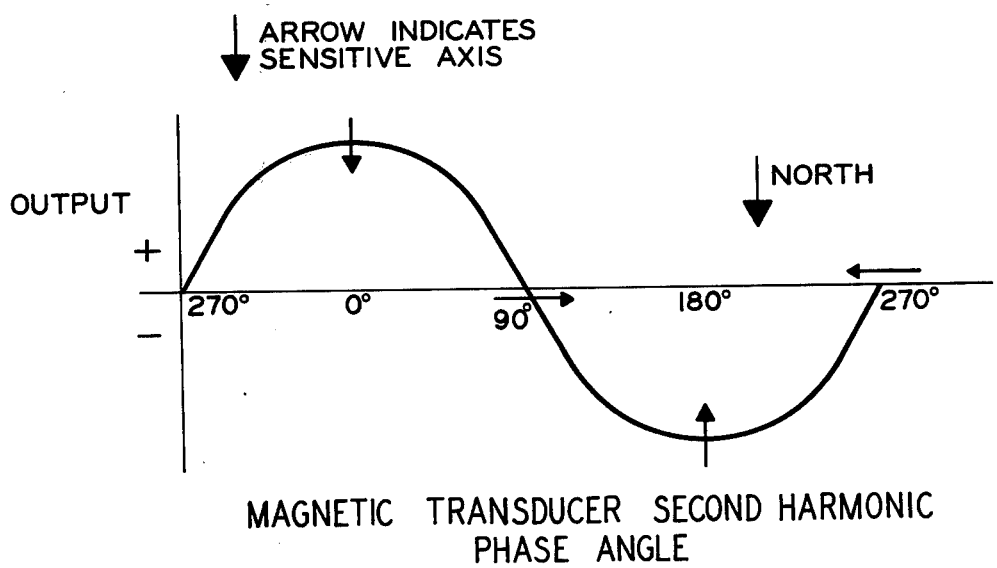
FIG. 9 MAGNETIC TRANSDUCER SECOND HARMONIC PHASE ANGLE

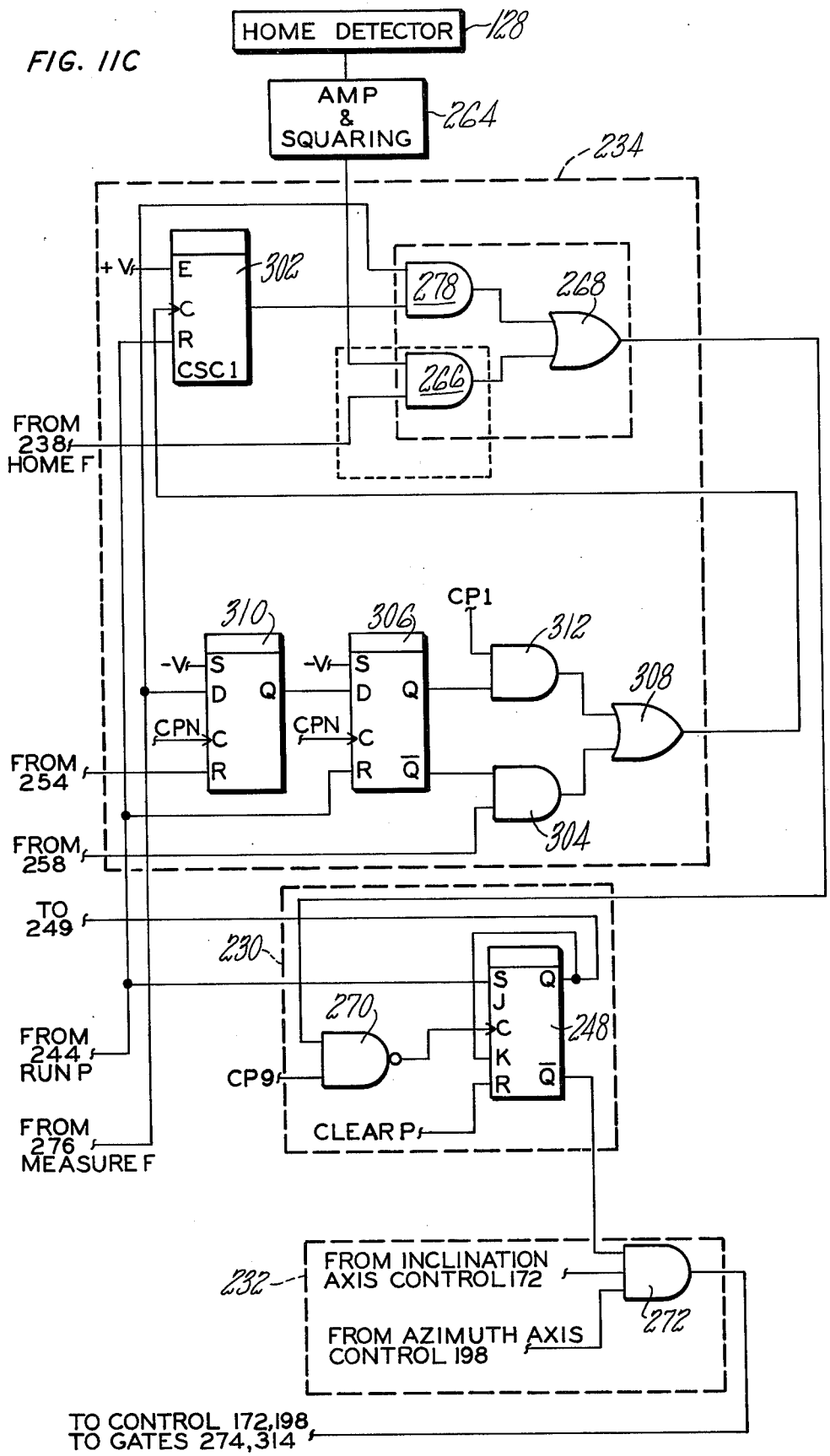

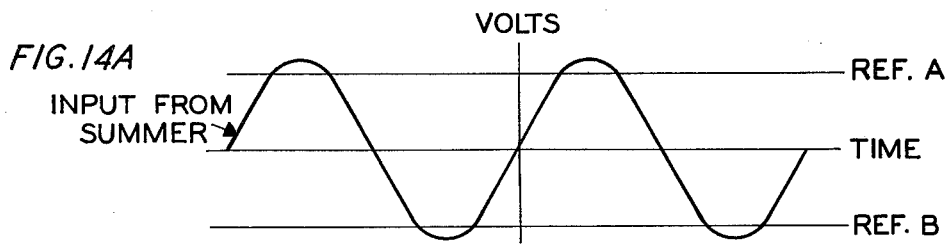
FIG.14A INPUT FROM SUMMER
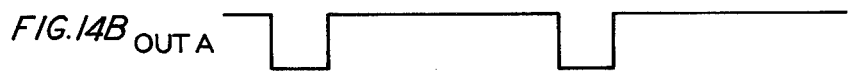
FIG.14B OUT A
FIG.14C OUT B
FIG.14D $\overline{OUT\ A}$
FIG.14E OUT B + $\overline{OUT\ A}$
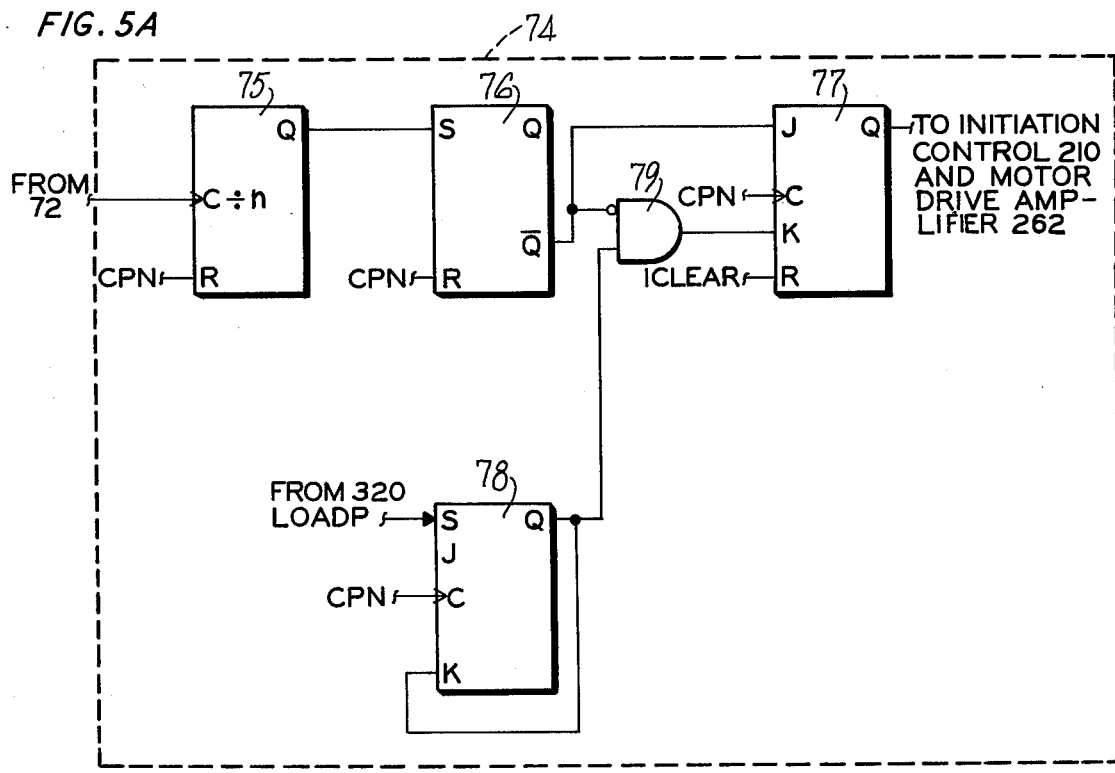
FIG.5A

BOREHOLE SENSOR

This is a continuation of application Ser. No. 576,627, filed May 12, 1975, now abandoned.

BACKGROUND OF THE INVENTION

This invention relates to the field of parameter sensors. More particularly, this invention relates to the field of borehole sensors where parameters in a borehole, particularly a gas or oil well, are sensed and transmitted to the surface.

In the field of oil and gas drilling, the usefulness of a system capable of detecting certain parameters at the bottom of the drill string and transmitting such data to the surface during the course of drilling has long been recognized. Several systems have been proposed for accomplishing such sensing and data transmission. One of the principal types of such systems is the mud pulse telemetry system wherein pulses are generated in the mud column in the drill string for transmission of data to the surface. The present invention is particularly adapted for use in mud pulse transmission systems.

While some proposals and systems for borehole telemetry have involved arrangements where sensor packages are periodically lowered into and raised from a well hole, by far the most preferred arrangement is to have the parameter sensing apparatus permanently positioned at the bottom of the well, preferably in a lower segment of the drill string. The permanent down hole position of the parameter sensors does, however, make the factors of reliability, accuracy and repeatability of parameter operation all the more important. Otherwise, the driller does not have a truely accurate indication of the direction of the well hole if the parameter sensors are not highly accurate, or serious loss of time and expense may be involved if it is necessary to remove the drill string at unscheduled times.

SUMMARY OF THE INVENTION

The downhole telemetry sensing device of the present invention includes:
1. A three axis device for determining:
   a. a vertical plane, using the force of gravity as a reference,
   b. a horizontal plane, using the force of gravity as a reference, and
   c. the north direction, using the earth's magnetic field as a reference.
2. A motor drive system to drive parts of the mechanism to desired positions about the axes.
3. Error transducers to determine deviation from the desired positions about the axes and provide feedback to the motor drive system.
4. A control and measuring system to measure the total movement of the motor drive system required to eliminate error.

The sensor system is a three gimbal system servo controlled by two accelerometers and one magnotometer. The accelerometers are used to establish the horizontal and vertical planes by finding the zero gravity position along two orthogonal axes, and the magnetometer is used to establish the direction of magnetic north in the horizontal plane.

An outer gimbal, known as the reference gimbal, measures the reference angle (R) between a reference mark on the drill string and the vertical plane containing the drill axis. The middle gimbal, or the inclination gimbal, measures the angle of inclination of the drill axis with respect to the vertical. The inner or magnetometer gimbal measures the angle between the horizontal projection of the drill axis and magnetic north in the horizontal plane. The sensor package is configured to be contained within the drill string, and thus the design is compatible with a cylindrical form where diameter is restricted by the diameter of the drill string, but where there is no significant restriction on length.

The reference gimbal consists of a tubular structure free to rotate coaxially with the drill string within a stationary tube in the drill string. An accelerometer is mounted on the reference gimbal with its sensitive axis perpendicular to the axis of rotation of the reference gimbal. The reference angle is measured by determining the movement required to move the accelerometer from a HOME position to a position where the output of the accelerometer is zero. The reference angle is preferably measured by counting the number of steps required for a step motor to go from a known "HOME" position to a position where the reference accelerometer output is zero.

An inclination gimbal for measuring the inclination angle (I) is mounted within the reference gimbal. The inclination gimbal also has an accelerometer whereby the inclination angle is measured by determining the movement required to move the accelerometer from a HOME position to a position where the output of the accelerometer is zero. The inclination angle is preferably measured by counting the number of steps required for a step motor to drive the inclination gimbal from a known "HOME" position to a position where the accelerometer output is zero.

Another gimbal is also mounted within the reference gimbal parallel to the inclination gimbal and slaved to the inclination gimbal. The third gimbal carrying the magnetometer is carried by this slaved additional gimbal. The azimuth angle (A) is also measured by determining the movement required to move the magnetometer from a HOME position to a position where output of the magnetometer is zero. The azimuth angle is preferably measured by counting the number of steps necessary for a stepping motor to drive the magnetometer to a null position whereby its relationship with respect to the earth's magnetic field is known.

One particular advantage of the preferred stepping motor apparatus of the present invention is that it eliminates the need for separate angle transducers and the attendant mechanical or reliability problems such angle transducers typically present. Instead, angle measurement is determined solely by counting the number of steps required to operate the stepping motors to drive the respective gimbals to the null positions. Thus, since accurate drive trains can be readily constructed, a system with extremely high accuracy is achieved.

BRIEF DESCRIPTION OF THE DRAWINGS

In the drawings, wherein like elements are numbered alike in the several figures:

FIG. 5 is a block diagram of the rotation sensor.

FIG. 5A is a schematic showing of the digital filter of FIG. 10B.

FIGS. 6A, 6B and 6C are curves showing outputs at various stages of the rotation sensor of FIG. 5.

FIG. 7 is a schematic representation of the sensor device for determining inclination, reference and azimuth angles.

FIG. 8 is a representative curve of the output of one of the accelerometers of FIG. 7.

FIG. 9 is a representative curve of the output of the magnetometer of FIG. 7.

FIGS. 11A, 11B and 11C are a schematic of the control system shown in block diagram in FIGS. 10A and 10B.

FIG. 14A shows the output from the summer of FIG. 10A which is delivered to the sign and magnitude detector.

FIGS. 14B, 14C, 14D and 14E show outputs from the sign detector of FIG. 10A.

DESCRIPTION OF THE PREFERRED EMBODIMENT

Figure 1:
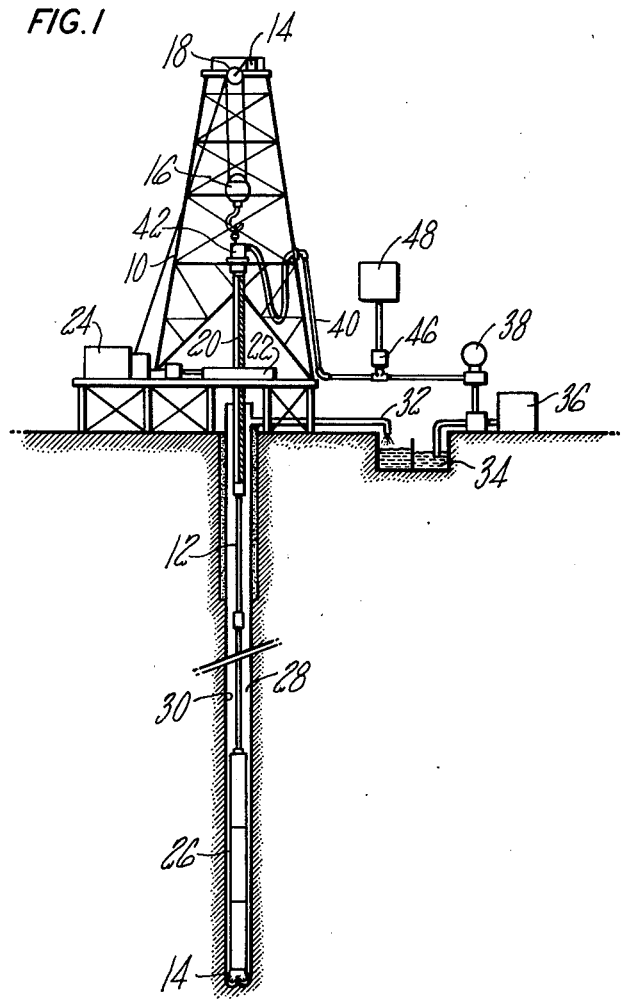
FIG. 1 is a generalized schematic view of a borehole and drilling derrick showing the environment for the present invention.

Referring now to FIG. 1, the general environment is shown in which the present invention is employed. It will, however, be understood that the generalized showing of FIG. 1 is only for the purpose of showing a representative environment in which the present invention may be used, and there is no intention to limit applicability of the present invention to the specific configuration of FIG. 1.

The drilling apparatus shown in FIG. 1 has a derrick 10 which supports a drill string or drill stem 12 which terminates in a drill bit 14. As is well known in the art, the entire drill string may rotate, or the drill string may be maintained stationary and only the drill bit rotated. The drill string 12 is made up of a series of interconnected segments, with new segments being added as the depth of the well increases. The drill string is suspended from a movable block 16 of a winch 18, and the entire drill string is driven in rotation by a square kelly 20 which slidably passes through but is rotatably driven by the rotary table 22 at the foot of the derrick. A motor assembly 24 is connected to both operate winch 18 and rotatably drive rotary table 22.

The lower part of the drill string may contain one or more segments 26 of larger diameter than other segments of the drill string. As is well known in the art, these larger segments may contain sensors and electronic circuitry for sensors, and power sources, such as mud driven turbines which drive generators, to supply the electrical energy for the sensing elements. A typical example of a system in which a mud turbine, generator and sensor elements are included in a lower segment 26 is shown in U.S. Pat. No. 3,693,428 to which reference is hereby made.

Drill cuttings produced by the operation of drill bit 14 are carried away by a large mud stream rising up through the free annular space 28 between the drill string and the wall 30 of the well. That mud is delivered via a pipe 32 to a filtering and decanting system, schematically shown as tank 34. The filtered mud is then sucked by a pump 36, provided with a pulsation absorber 38, and is delivered via line 40 under pressure to a revolving injector head 42 and thence to the interior of drill string 12 to be delivered to drill bit 14 and the mud turbine if a mud turbine is included in the system.

The mud column in drill string 12 also serves as the transmission medium for carrying signals of down the well drilling parameters to the surface. This signal transmission is accomplished by the well known technique of mud pulse generation whereby pressure pulses are generated in the mud column in drill string 12 representative of sensed parameters down the well. The drilling parameters are sensed in a sensor unit 44 (see also FIG. 2) in a drill collar unit 26 near or adjacent to the drill bit. Pressure pulses are established in the mud stream in drill string 12, and these pressure pulses are received by a pressure transducer 46 and then transmitted to a signal receiving unit 48 which may record, display and/or perform computations on the signals to provide information of various conditions down the well.

Figure 2:
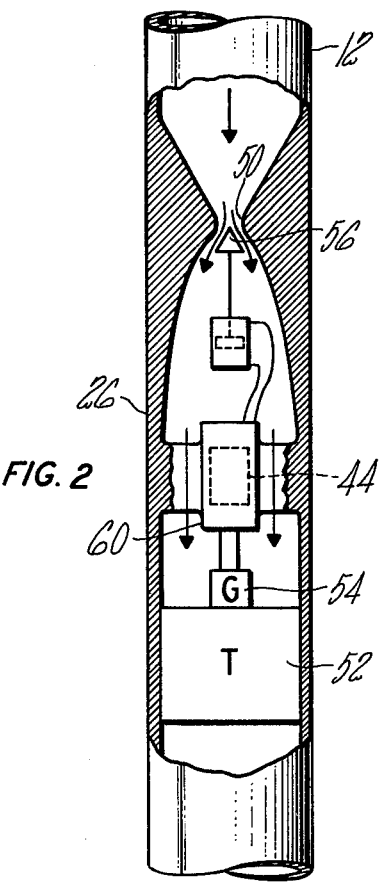
FIG. 2 is a view of a section of the drill string of FIG. 1 showing, in schematic form, the drill string environment of the present invention.

Referring briefly to FIG. 2, a schematic system is shown of a drill string segment 26 in which the mud pulses are generated. The mud flows through a variable flow orifice 50 and is delivered to drive a turbine 52. The turbine powers a generator 54 which delivers electrical power to the sensors in sensor unit 44. The output from sensor unit 44, which may be in the form of electrical or hydraulic or similar signals, operates a plunger 56 which varies the size of variable orifice 50, plunger 56 having a valve driver 57 which may be hydraulically or electrically operated. Variations in the size of orifice 50 create pressure pulses in the mud stream which are transmitted to and sensed at the surface to provide indications of various conditions sensed by sensor unit 44. Mud flow is indicated by the arrows.

For several classes of data or parameters to be sensed at the bottom of a well, it is quite unnecessary to sense the data and obtain readings more frequently than once every 30 feet or so of depth. This corresponds to readings every ¼ hour to 1 ½ hour at typical drilling rates of 120 feet per hour to 23 feet per hour. It therefore becomes desirable to turn off the down hole sensing equipment during long periods of drilling, thereby minimizing wear of the sensors, transmitter and other parts of the telemetry system which would otherwise result from continuous operation. The invention shown in FIGS. 3-6 is directed to this feature of turning off the parameter sensing equipment by sensing and distinguishing between periods of rotation and absence of rotation of the drill string. The invention requires a rotation sensor to detect drill string rotation and interrupt the delivery of electrical power to the well parameter sensors when the drill string is rotated, and, conversely, to permit the delivery of power to the well parameter sensors when the drill string is not rotated. A magnetic detecting device which senses the earth's magnetic flux is used as a rotation sensor to detect the presence or absence of rotation of the drill string. This rotation sensor contains no moving part, and, therefore, unlike other motion sensors which may contain moving elements, offers high reliability notwithstanding exposure to mechanical shocks and vibrations.

Figure 3:
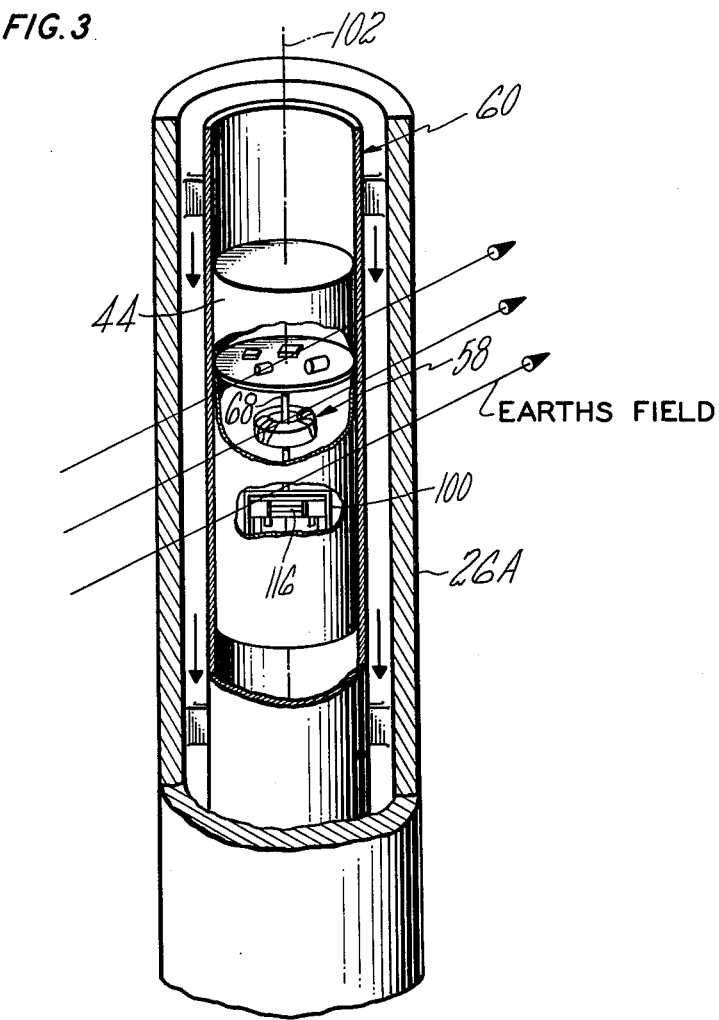
FIG. 3 is a view, partly in section, of a detail of FIG. 2.

Referring now to FIGS. 2 and 3, some details of a drill string segment 26 are shown housing the rotation sensor 58 in accordance with this invention. Since both the rotation sensor and one or more other sensors in sensor unit 44 are magnetically sensitive, the particular drill string segment 26A which houses the rotating sensor of this invention and the other sensor elements must be a non-magnetic section of the drill string, preferably of stainless steel or monel. The rotation sensor 58 may be incorporated in sensor unit 44 or may be separately packaged, and for the sake of convenience it is shown as part of sensor unit 44 in FIG. 3. Sensor unit 44 is further encased within a non-magnetic pressure vessel 60 to protect and isolate the sensor unit from pressures down in the well.

Figure 4:
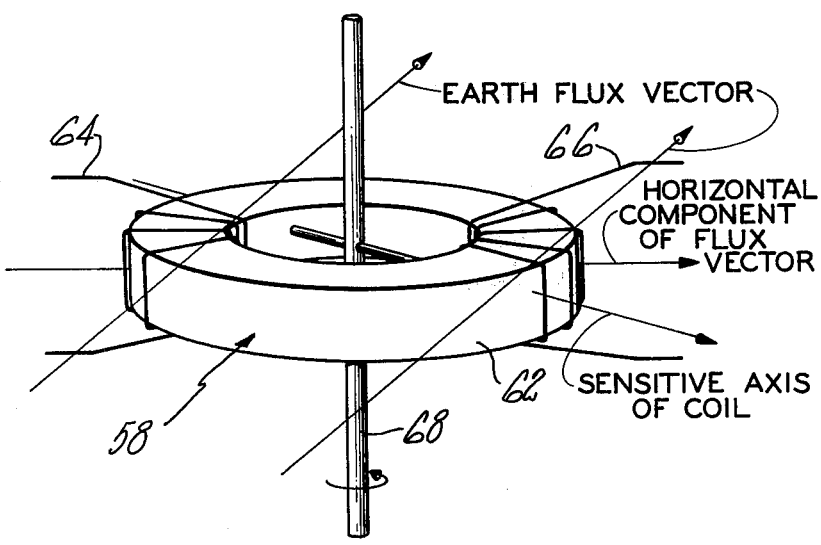
FIG. 4 is a view of the flux magnetometer of the rotation sensor.

Referring to FIG. 4, the rotation sensor 58 is a ring-core fluxgate magnetometer which is used to determine the direction of the earth's magnetic field. Although theoretically many other kinds of flux detecting devices could be used, the ring-core fluxgate magnetometer is used because of its low power consumption and its rugged physical construction. Operation of the ring-core fluxgate magnetometer is based on the nonlinear or asymmetric characteristics of the magnetically saturable transformer which is used in the sensing element. As seen in FIG. 4, the device has a toroidal or annular core 62 which is appropriately wound (winding details not shown), an input or primary winding 64 and an output or secondary or sensing winding 66. Core 62 is made of a material with a square B-H hysteresis curve such as permalloy. The characteristic of this device is such that when the core is saturated by appropriate AC energizing of the primary winding in the absence of an external magnetic field, the output of the secondary windings, i.e. the voltage induced in the secondary windings is symmetrical, i.e. contains only odd harmonics of the fundamental of the driving current. However, in the presence of an external magnetic signal field such as the earth's magnetic field, the output voltage of the secondary windings becomes asymmetrical with second and other even harmonics of the primary frequency appearing at the output of the secondary windings. This asymmetry is related in direction and magnitude to the signal field and can be detected by several known techniques. Discussions of such fluxgate magnetometers can be found in the article by Gordon and Brown, IEEE Transactions on Magnetics, Vol. Mag-8, No. 1, March 1972, and the article by Geyger, Electronics, June 1, 1962 and in the article by R. Munoz, AA-3.3, 1966 National Telemetering Conference Proceedings, to all of which reference is made for incorporation herein of a more detailed discussion of construction and theory of operation of the magnetometer.

As employed in the present invention, the input to the primary windings 64 drives core 62 to saturate twice for each cycle of the primary winding input. The moment in time that the core saturates is related to the ambient external magnetic field that biases the drive field in the core. That is, saturation of the core varies as a function of the intensity and direction of the earth's magnetic field, which field is indicated diagrammatically by the flux lines in FIG. 4.

Sensor 58 is physically supported on a shaft 68 which is fixed in drill string segment 26A and is on or parallel to the axis of rotation of drill string segment 26A. While the drill string is being rotated, rotation sensor 58 is also being rotated in the ambient magnetic field of the earth. As rotation sensor 58 is rotated, the combined action of the input to primary windings 64 and the ambient magnetic field of the earth result in a varying phase shift in the second harmonic output at secondary windings 66.

Referring now to FIG. 5, a block diagram of the rotation sensor output signal processing is illustrated. The input to primary winding 64 emanates from an oscillator 61, the output frequency of which is divided in half by divider 63 and then delivered to amplifier 65 and then delivered to primary winding 64. The output from secondary windings 66, which is tuned to the second harmonic of the primary winding input by capacitor 67, is delivered to a buffer amplifier 69 and then to phase detector 70A of detector 70. Detector 70 also includes low pass filter 70B and amplifier 70C. The output of oscillator 61 (which is equal in frequency to the second harmonic output of secondary winding 66) is also delivered to phase detector 70A. The phase angle of the second harmonic output of secondary windings 66 is a function of the rate of rotation of magnetometer 58, and that phase angle varies as a function of changes in the rate of rotation of magnetometer 58. The output of secondary windings 66 is compared with the output of oscillator 61 in phase detector 70A, where the difference in phase between the two is detected and delivered to low pass filter 70B. The output from filter 70B (when the drill string is rotating) is an alternating signal which varies in frequency as a function of the rate of change of the phase angle of the second harmonic output of secondary winding 66; i.e. the output of filter 70B varies in frequency as a function of changes in the rate of rotation of the drill string. The output from filter 70B is amplified in amplifier 70C and is then delivered to a zero crossing detector 72 which produces an output pulse each time the alternating signal from detector 70 crosses through the zero value. The pulses generated by crossing detector 72 (which are also a function of the rate of rotation of the drill string) are delivered to a digital filter 74 which produces output signals commensurate with states of rotation and no rotation.

Referring also to FIG. 5A, digital filter 74 includes a counter-divider 75, an S-R type flip flop 76, J-K type flip-flops 77 and 78, and an AND gate 79 connected as shown. The output pulses from zero crossing detector 72 are delivered to the C input of counter-divider 75. Assuming the drill string is normally rotating, the pulses delivered to counter 75 cause counter 75 to overflow before being reset by a clock pulse CPN (which may be any selected subdivision of a clock pulse commensurate with a predetermined minimum rate of rotation), whereby the Q output of counter 75 goes high. The Q output of counter 75 is connected to the S input of flip-flop 76 and the high state of the Q output of counter 75 sets flip-flop 76, whereby the Q output of flip-flop 76 goes high and the $\overline{Q}$ output goes low. The $\overline{Q}$ output of flip-flop 76 is connected to the J input of flip-flop 77. Flip-flop 77 is initially cleared by a reset pulse ICLEAR which may be obtained from any convenient place in the system upon the initiation of power in the control system. The J input of flip-flop 77 is examined by the leading edge of each pulse CPN delivered to the C input of flip-flop 77 whereby the J input is delivered to the Q output. Thus, when the drill string is normally rotating, counter 75 repeatedly overflows and is then reset by clock pulses CPN; flip-flop 76 is repeatedly set by the Q output from counter 75 and reset by the upper level of clock pulses CPN; and the J input of flip-flop 77 is low each time it is examined by the leading edge of the CPN pulse at the C input of flip-flop 77.

The Q output of flip-flop 77 is thus also low when the drill string is normally rotating; and a first output level indicating rotation is delivered from filter 74 (see Level X, FIG. 6C).

Referring again to FIG. 6, the various signals discussed above are shown graphically. The abscissa in each graph is time, and the ordinate in each graph is signal amplitude. FIG. 6A shows the second harmonic output of detector 70, FIG. 6B shows the pulse output from zero crossing detector 72, and FIG. 6C shows the outputs from digital filter 74. From time $T_1$ to $T_2$ in all the graphs, the drill string is rotating at constant speed. As the drill string slows down when approaching a state of no rotation (after time $T_2$), the frequency of the alternating output of detector 70 decreases, thus resulting in a lower frequency output from zero crossing detector 72.

When the rotation of the drill string ceases, or the rate of rotation drops to a very low rate on the way to a state of no rotation, the pulses from zero crossing detector 72 drop below a predetermined minimum frequency corresponding to a predetermined low rate of rotation of the drill. Since the angular velocity of the drill string must go through decreasing levels in going from normal to zero rotation, a predetermined low rate (on the order of 3 rpm or less) can be used as a signal of no rotation, in that rotation is about to cease and will have ceased within the time required to initiate operation of desired sensors which operate when rotation has ceased.

When rotation ceases or drops below the predetermined low rate, which signals the imminence of the state of no rotation, counter 75 does not overflow before being reset by the clock pulse CPN. Thus the Q output of counter 75 stays low, and flip-flop 76 does not get set. Since flip-flop 76 does not set, the $\overline{Q}$ output of flip-flop 76 is high and the J input of flip-flop 77 is high. The leading edge of clock pulse CPN then sets flip-flop 77 whereby the Q output of flip-flop 77 is high (see level Y of FIG. 6C) indicating the state of no rotation. Thus, when the predetermined minimum frequency output from zero crossing detector 72 is maintained for a given time period from $T_2$ to $T_3$ (e.g. 10 seconds), the digital filter output (i.e. the Q level of flip-flop 77) is switched, as shown in FIG. 6C, to a second level indicating a state of no rotation (see level Y of FIG. 6C). This second output level, commensurate with a condition of no rotation, is then used as a control signal for arming or powering the other sensor elements in sensor unit 44. Prior to generation of this control signal, the other sensor elements in unit 44 are not powered. The control signal (i.e. the second output level from digital filter 74) is used as a signal to arm or deliver the power from generator 54 to valve driver 57 and to those other sensor elements, such as by operating flip-flops or arming gates to enable power to be delivered to the other sensor elements in sensor unit 44 or in any other desired fashion to that end.

Referring now to FIG. 7, the invention of the parameter sensing elements in sensor unit 44 and operation thereof are shown, i.e. the sensor units for sensing the various down the well parameters which are to be sensed after rotation has ceased and transmitted to the surface periodically to provide a measurement and indication of certain directional characteristics at the bottom of the well.

The characteristics to be measured and determined in the present invention are directional characteristics of the drilling line, especially a drilling line which is slanted either from its point of origin or from an intermediate point in the well. As is known in the art (for example see U.S. Pat. No. 3,657,637 to Claret), the parameters of inclination angle, azimuth angle and reference angle must be known in order to have total information about the position and direction of a drilling line. For purposes of clarification, the following definitions of the several angles are presented:

1. Inclination angle (i) is the angle of inclination of the drill axis with respect to the vertical (V) where both the drill axis and the vertical are contained in a common vertical plane. Referring to FIG. 7, the drilling axis is X'X, and I = angle XOV.

2. Azimuth (A) is a magnetic azimuth. It is defined as the dihedral angle formed by the vertical plane which contains the horizontal projection of the drill axis and the vertical plane containing the horizontal projection of the local terrestral magnetic field. Referring to FIG. 7, it is the angle A as shown in connection with the ring core fluxgate magnetometer.

3. The reference angle R is the dihedral angle defined by the intersection between a first plane containing the drill axis and a line (commonly referred to as the scribe line) on the drill string parallel to the drill axis and a second plane containing the drill axis and the vertical projection of the drilling axis. The reference angle R is shown at the top of the unit in FIG. 7.

Generally speaking, the sensor system, shown in FIG. 7, includes:

1. A mechanical device with three axes for determining
    a. A vertical plane, using the force of gravity as a reference, and
    b. A horizontal plane, using the force of gravity as a reference, and
    c. The north direction, using the earth's magnetic field as a reference.
2. A motor drive system to drive parts of the mechanism to desired positions about the axes.
3. Error transducers to determine deviation from the desired positions about the axes and provide feedback to the motor drive system.
4. A control and a measuring system to measure the total movement of the motor drive system required to eliminate the error.

FIG. 7 schematically shows the mechanism of the system and the interaction with the motor drives and error transducers. The sensor is a multi-axis or multi-gimbal system servo controlled by error transducers. More specifically, the sensor consists of a three gimbal system, servo controlled by two error transducing accelerometers and one error transducing magnetometer. The accelerometers are used to establish horizontal and vertical planes, and the magnetometer is used to establish a direction of magnetic north in a horizontal plane.

The sensor includes an outer frame 100 which is rotatably mounted in sensor unit 44 in pressure vessel 60 with non-magnetic drill collar section 26A (see FIG. 3). Frame 100 is rotatably mounted on axis 102 which is the axis of the drill string at the bottom of the well, or frame 100 may be mounted for rotation about an axis parallel to axis 102. Frame 100 is mounted for such rotation by shafts 104 and 106 which extend from opposite ends of the frame and are mounted in bearings 108 and 110, respectively, which are, in turn, connected to sensor housing 44 by supports 112 and 114.

Frame 100 is shown as a rectangular structure with sides parallel to axis 102 and ends perpendicular to axis 102; however, the frame can be of any shape symmetric about axis 102 or could be a surface of revolution about axis 102. Thus, in the embodiment being discussed, the axis of the frame, which is the axis of rotation of the frame, coincides with or may be parallel to drill string axis 102. Frame 100 constitutes a first gimbal in the system.

A first accelerometer 116 (sometimes referred to as the reference accelerometer) is mounted on a platform 118 between the sides of frame 100 with its sensitive axis perpendicular to the direction of drill string axis 102 (as used throughout this specification, the term "perpendicular" as used with lines or axes will be understood to mean a right angle relationship regardless of whether the lines or axes intersect in a common plane or are in different planes. By definition, the sensitive axis is the axis along which gravity forces will generate an output. Accelerometer 116 is an error transducing device of the type whose output goes to zero when its sensitive axis is perpendicular to the force of gravity (i.e., the null position) and which has maximum output when its sensitive axis is parallel to the force of gravity (see FIG. 8 where the ordinate is accelerometer output and the abscissa is the angle of the sensitive axis of the accelerometer with respect to gravity). A particularly accurate and desirable type of such device is known in the art as a force balance accelerometer, of which several types are available. The output from accelerometer 116 is delivered via motor drive control 120 in control section 121 to a stepping servo motor 122 to rotate frame 100 until accelerometer 116 reaches a null position.

Accelerometer 116 is used in determining the reference angle R, and thus accelerometer 116 may be referred to as the reference accelerometer. Bearing in mind the previously stated definition of the reference angle R, a reference line must first be established parallel to axis 102, and that reference line must be fixed relative to the drill string or drill collar segment 26A. That reference line is identified as scribe line 124, and it is arbitrarily located parallel to axis 102. The angle R is thus equal to the angle between scribe line 124 and the vertical plane containing drill axis 102, i.e. angle R is the angle between the scribe line and the "high side" of the hole as that term is understood in drilling parlance. Scribe line 124 is also representable by a light path in this invention.

To determine the angle R in the present invention, on a signal from control 121 motor 122 first drives frame 100 and accelerometer 116 to a "start" or HOME position in which there are known angular relationships to scribe line 124. That home position is conveniently selected as alignment with the scribe line 124 itself, and the attainment of that alignment is determined photoelectrically by employment of a light source 126 and a photo cell 128. Light source 126 and photo cell 128 are shown mounted directly or indirectly on support 114, but it will be understood that they may be mounted in any way fixed relative to drill string segment 26A. The light path 130 from source 126 to photo cell 128 is in the plane defined by scribe line 124 and rotation axis 102 (thus path 130 is equivalent to scribe line 124). Two rotating discs, 132 and 134, are in the light path 130. Each of these discs has an aperture, 136 and 138, respectively, and the light beam 130 is interrupted except when apertures 136 and 138 are simultaneously aligned with the light beam to permit light to reach photo cell 128. Disc 132 is mounted directly on shaft 106 (and is thus directly mounted on the first gimbal) and disc 134 is separately mounted on a shaft 140 (the support for which is not shown for purposes of clarity) and is directly driven by a geared connection with disc 132. Disc 132 permits the light to pass once for each revolution of frame 100 and is sized to permit the light to pass over an arc of approximately 12°; disc 134 makes one revolution for every 30° of rotation of frame 100 and is sized to pass the light over less than 1° of arc. Thus, the light from light source 126 can only reach photo cell 128 once in a complete revolution of frame 100, and then only in a band less than 1° wide. When the home position is reached, a first plane is defined by scribe line 124 (or light beam 130) and axis 102.

When operation of the sensor system is initiated by the control signal from digital filter 74, a signal from motor drive control 120 is delivered to stepping motor 122, which is drivingly connected to shaft 106 through gear train 142, and motor 122 drives frame 100 in a first direction of rotation (assumed counterclockwise) until the light is incident on photo cell 128. The output from photo cell 128 is delivered to control 121 to terminate this operation of motor 122. That establishes the start or home position for reference accelerometer 116 for measuring the reference angle. Assuming that accelerometer 116 is now in any position other than its null position, the accelerometer, which may be considered an error transducer, will deliver an output signal to motor drive control 120 in control section 121. Motor drive control 120 then operates to deliver operating pulses to motor 122 to cause the frame or gimbal 100 to be rotated (clockwise or counterclockwise) until the sensitive axis of accelerometer 116 has reached a horizontal position, i.e., perpendicular to the force of gravity, whereupon the output from accelerometer 116 reaches a null and causes drive control 120 to terminate rotation of gimbal 100. The sensitive axis of accelerometer 116, in this null position, defines a vertical plane (a second plane) which includes axis 102. This second plane and the first plane, defined with reference to the scribe line and axis 102 are the planes between which the reference angle R is measured. Accordingly, the net number and sign (corresponding to direction of rotation) of equal steps required to operate stepping motor 122 to drive accelerometer 116 from its home position to the null position, and hence the net number of pulses delivered from motor control unit 120, is a measure of reference angle R. The pulsed output from motor controller 120 is also delivered to a binary up-down counter 144. The number of pulses counted by counter 144 constitutes data or information commensurate with the reference angle R, and this data is eventually transmitted to the surface of the well through mud pulse techniques so that the angle R is known at the surface of the well.

A second error transducing accelerometer 148 is fixedly mounted on a second gimbal in the form of shaft 150 (having axis of rotation 151) which is rotatably mounted on the first gimbal 100 via bearings 152. This second accelerometer will sometimes be referred to as the inclination accelerometer. The sensitive axis of inclination accelerometer 148 is arranged orthogonally with respect to the sensitive axis of reference accelerometer 116. Inclination accelerometer 148 establishes a vertical plane perpendicular to the plane established by reference accelerometer 116, and, operating in conjunction with reference accelerometer 116, serves to define a horizontal plane and determines the angle of inclination, I, of drilling axis 102.

In operating inclination accelerometer 148, it is first driven to a start or HOME position which is an arbitrarily preselected and known position of the accelerometer and shaft 150 with respect to frame 100. The accelerometer's home position is detected through an optical system similar to the system used for detecting the home position of accelerometer 116. This optical system includes a light source 154, a photo cell 156, light path 158, and rotating discs 160, 162 and 164 which have apertures 166, 168 and 170 therein, respectively. Disc 164 is rigidly mounted on a shaft 171, and disc 160 is drivingly connected to a stepping servo motor 174 by a gear train as shown. The three discs are also drivingly interconnected by a gear train as shown. The gear train is sized so that the discs travel at slightly different rotational speeds relative to rotation of gimbal 150. A preferred arrangement has disc 160 making one full revolution for each 10° of rotation of gimbal 150 while discs 162 and 164 each make one complete rotation for each 9° and 8° of rotation of gimbal 150, respectively. Apertures 166, 168 and 170 become aligned only once for each 360° of rotation of gimbal 150; that alignment always occurring along light path 158 to permit the light beam to reach photo cell 156 once for any complete 360° rotation of gimbal 150.

The use of the three discs 160, 162 and 164 at slightly different rotating speeds results from the fact that it is impractical to attach one of the discs directly to gimbal 150 for the inclination measuring system. If one of the discs were attached directly to gimbal 150, then a two disc system could be used as in the case for the reference angle system where one of the discs is attached directly to gimbal 100.

When operation of the inclination accelerometer is desired, its motor drive control 172 delivers a signal to stepping motor 174 to drive the motor in a first direction. The discs 160, 162 and 164 and shaft 171 are thus rotated, and shaft 171 drives through a worm, and gear 174 to rotate gimbal 150 about its axis in a first direction (assumed counterclockwise). When the three apertures 166, 168 and 170 reach the position of alignment which permits the light beam to be delivered to photo cell 156, the home position of accelerometer 148 is reached, and the output from the photo cell 156 is delivered to control 121 to terminate the operation of motor 174. Accelerometer 148 is thus in a known position relative to frame or gimbal 100.

Assuming that accelerometer 148 is in any position other than the position where its sensitive axis is perpendicular to the direction of gravity, accelerometer 148 will function as an error transducer, and error signals will be delivered to motor drive control 172 in control section 121. Motor drive control unit 172 functions to generate output pulses which are delivered to stepping motor 174 to drive stepping motor 174 in a step-by-step manner in the direction to reduce the error signal. Gimbal 150 and accelerometer 148 are thus driven in a series of steps until the sensitive axis of accelerometer 148 is perpendicular to the direction of gravity, i.e. until the sensitive axis is a line in a horizontal position, which line defines a second vertical plane established by the reference accelerometer. Since accelerometer 148 is in the null position, further operation of the stepping motor is terminated.

Bearing in mind that the null position of reference accelerometer 116 defines a first horizontal line (the sensitive axis of accelerometer 116), and that the null position of inclination accelerometer 148 also defines a second horizontal line (the sensitive axis of accelerometer 148) which is orthogonal with respect to the first horizontal line, these two orthogonal horizontal lines cooperate to define a horizontal plane. This is so because a plane can be defined by two orthogonal lines or by one line and a direction. As applied to the present invention, the horizontal line defined by the sensitive axis of either of the two accelerometers defines the direction of a plane which includes the horizontal line of the other accelerometer. Thus, the two sensitive axes of accelerometers 116 and 148 combine and cooperate to define a horizontal plane.

The intersection of the first vertical plane (established by the sensitive axis of accelerometer 116) and the second vertical plane (established by the sensitive axis of accelerometer 148) defines a vertical line which intersects the drill axis 102, thus defining the inclination angle I.

As with the measurement of reference angle R, the output pulses from motor drive control 172 are delivered to a binary up-down counter 176. The net number of steps of stepping motor 174, and hence the net number of pulses delivered to counter 176, necessary to drive accelerometer 148 to the null position from the home station is directly related to and a measurement of the angle of inclination I of drilling axis 102 with respect to the vertical. The pulses counted by counter 176 are eventually transmitted to the surface by mud pulse telemetry techniques so that the angle of inclination I is known at the surface.

The sensor system also includes an azimuth sensor in the form of a ring core fluxgate magnetometer 178. Magnetometer 178 is the same type of device as magnetometer 58 disclosed and discussed above in FIG. 4 with regard to the rotation sensor. Accordingly, no detailed discussion of the nature or construction of magnetometer 178 is necessary. Magnetometer 178 is fixed to a shaft 180 which is a third gimbal in the sensor system. Gimbal 180 is rotatably mounted in bearing 182 for rotation about the axis 183 of shaft 180, and bearing 182 is fixed to rotatable shaft 184. Shaft 184 is parallel to shaft 150 and is rotatably mounted on frame 100 by bearings 186, and shaft 184 is rotatably driven about its axis by shaft 171 through worm and gear 188. Thus, shaft 184 is slaved to gimbal 150 which acts as a master for shaft 184. The toroidal core of magnetometer 178 is arranged perpendicular to the axis 183 of gimbal 180, and the axis of gimbal 180 is positioned perpendicular to the sensitive axis of inclination accelerometer 148. Thus, when reference accelerometer 116 and inclination accelerometer 148 reach their horizontal or null positions, gimbal 180 is in a vertical position and the toroidal core of magentometer 178 is in a horizontal plane.

Gimbal 180 is rotated about its axis through bevel gear assembly 190 and worm and gear 192. The gear of 192 and one of the beveled gears of 190 are connected together by sleeve 191 which is rotatably mounted on shaft 184. Worm and gear 192 are, in turn, driven by rotatable shaft 194 which is drivingly connected to an azimuth servo motor 196. A photoelectric detection system identical to that previously described with respect to the inclination sensor system is arranged to operate as shown between azimuth servo motor 196 and shaft 194. Since this optical system is identical to that previously described with respect to the inclination sensor, no further discussion of it should be required, and the parts of this azimuth optical system are numbered to correspond with the similar parts of the inclination optical system with the addition of a prime (') superscript. The optical system associated with the azimuth sensor is also used to determine a start or HOME position for azimuth sensor 178.

The azimuth sensor is employed to determine the north direction by sensing the local horizontal component of the earth's magnetic field. As is done with the reference and inclination sensors, the azimuth sensor is first driven to a start or HOME position which is a previously determined and known position with axis 183 perpendicular to drill string axis 102 and with the sensitive axis of the magnetometer orthogonal to drill string axis 102 and with the north seeking axis of the magnetometer (the north seeking axis being perpendicular to the sensitive axis) pointing in the direction of the drill bit (i.e. downhole). The azimuth sensor is driven to this home position by a signal from motor drive control 198 which is delivered to azimuth servo motor 196 to rotate gimbal 180 counterclockwise about its axis until the home position is reached. The reaching of the home position is, of course, determined by the incidence of light beam 158' on photo cell 156' whereupon the output from photo cell 156' is delivered to control section 121 to terminate this first operation of motor 196.

Assuming that magnetometer 178 is in any position other than its null position, an error signal is generated which results in operating signals from motor drive control 198 to stepping motor 196 to reduce the error signal generated by the magnetometer. Magnetometer 178 functions as an error transducer in that the phase angle of the second harmonic of its output will rise and fall depending on the orientation of its sensitive axis with respect to the earth's magnetic field. The characteristic of this transducer is that this phase angle change varies as a function of the orientation of its sensitive axis with the earth's magnetic field, the variation being from a maximum or minimum output when the sensitive axis is aligned with the earth's magnetic field and falling to zero when the sensitive axis is perpendicular to the earth's magnetic field. This relationship is shown in FIG. 9. The magnetometer 178 functions as an error transducer in that its output will go to zero as it is driven to a position where its sensitive axis is perpendicular to the earth's magnetic field.

The error signal generated by magnetometer 178; i.e. the output signal generated when the magnetometer is in a position other than the null position, is delivered to motor drive unit 198 in control section 121. Upon receipt of these error signals from magnetometer 178, motor drive unit 198 generates output pulses which are delivered to stepping motor 196 to drive stepping motor 196 in a step-by-step manner to drive magnetometer 178 to its zero output or null position. Magnetometer 178 and its gimbal 180 are thus driven in a series of steps until the sensitive axis of magnetometer 178 is perpendicular to the direction of the earth's magnetic field, and further operation of the stepping motor is terminated.

The algebraic sum of the output pulses from motor drive 198 and motor drive 172 are delivered through "OR" gate system 199 to a binary up-down counter 200 in control section 121. OR gate system 199 consists of OR gate 199(a) for sign signals and OR gate 199(b) for number signals. The net number and sign of the said algebraic sum of pules delivered to counter 200, necessary to drive magnetometer 178 to the null position from the home position is a direct measurement of the axis of direction of the well axis with respect to magnetic north, i.e. the angle A. The pulses from motor drive 198 and 172 must be algebraically summed because gimbal 183 is driven both by its own motor 196 and is also rotated one step for each step of motor 174 as shaft 171 drives accelerometer 148 to its null position because of the drive connection between shafts 171 and 184 and bevel gears 190. The pulses counted by counter 200 are eventually transmitted to the surface by mud pulse telemetry techniques so that the azimuth angle A is known at the surface.

The sensor system described above thus consists of a three gimbal system servo controlled by two error transducing accelerometers and one error transducing magnetometer. The accelerometers are used to establish horizontal and vertical planes by finding zero gravity positions along two orthogonal axes, and the magnetometer is used to establish the direction of magnetic north in the horizontal plane. The system measures the reference angle, R, the inclination angle, I, and the azimuth angle, A, those three items of angular information being sufficient to define the position and direction of the drill string at the bottom of the well.

It will, of course, be understood that electrical inputs are required to each of the three sensors, namely accelerometer 116, accelerometer 148 and magnetometer 178 so that these sensors can function as error transducers generating outputs which are delivered to their respective motor drive controls. These electrical inputs can be supplied in any known and desired fashion (including slip rings) from generator 54, and they have been shown only schematically in FIG. 7 as $V_o$.

One particuflar advantage of the sensor system of the present invention is that it eliminates the need for separate angle transducers and attendant mechanical or reliability problems such angle transducers typically present. Instead of such angle transducers, angular measurement is accomplished in the present invention merely by counting the net number of steps of the stepping motors or the net number of pulses delivered to the stepping motors to accomplish each step. The drive trains associated with each stepping motor are highly accurate drive trains such that each step of the stepping motor results in a known angular movement of its associated gimbal. Thus, angular measurement is reduced to the simple process of algebraically counting the pulses delivered to or the steps of the stepping motor.

The entire sensor mechamism shown in FIG. 7 may be immersed in a viscous silicone oil which entirely fills the sensor housing 44. The oil serves both to protect the sensor mechanism from vibration and shock damage while also serving to lubricate the bearings and gears and also act as a heat transfer medium for the motors.

In order to protect the precision and sensitive gear trains which drive gimbals 150 and 180 in shaft 184 from the effects of differential thermal expansion, the drive worm gears of gear trains 174, 188 and 192 have been isolated by expansion bellows 202 and symmetrically supported within one piece hangers 204. Thus, shafts 171 and 194 are actually shaft segments joined together by the expansion bellows 202 which faithfully transmit the rotation of the shafts while accommdating all thermally induced axial expansion of the shafts in both directions so that there will be no displacement of the points of contacts between mating gears in the gear trains.

If hard wired electrical inputs and/or outputs for the accelerometers are used, safety stops may need to be employed. Thus, referring to gimbal 150, a mechanical stop 206 extends from gimbal 100 and is positioned to be contracted by finger 208 fixed to gimbal 150. Finger 208 and stop 206 combine to limit the rotation of gimbal 150 to less than 360° in any direction, thus preventing the breaking of hard wired electrical lines. Similar steps could also be employed for the other gimbals if circumstances warranted.

Figure 10A:
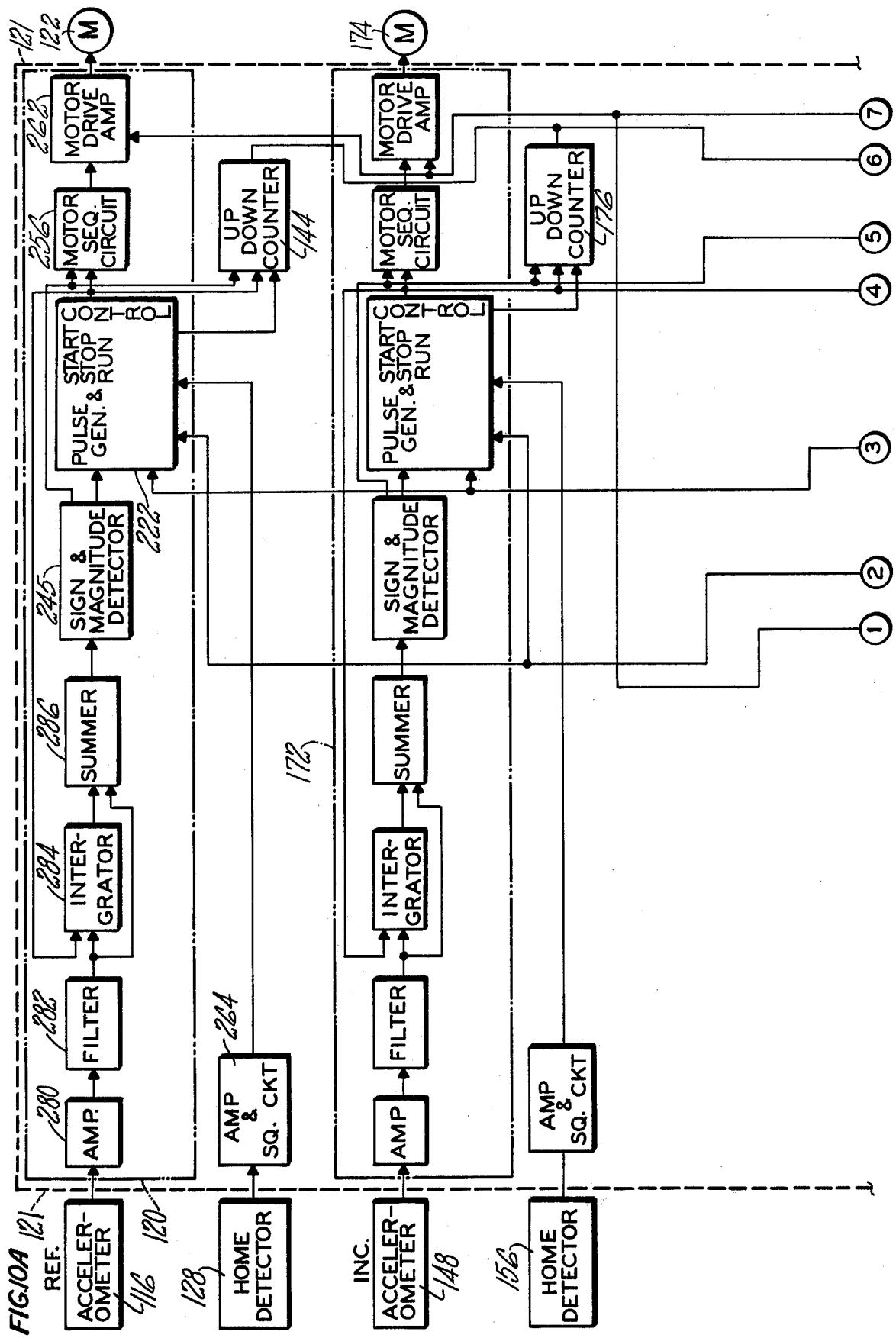
FIGS. 10A and 10B constitute a block diagram of the control system.
Figure 10B:
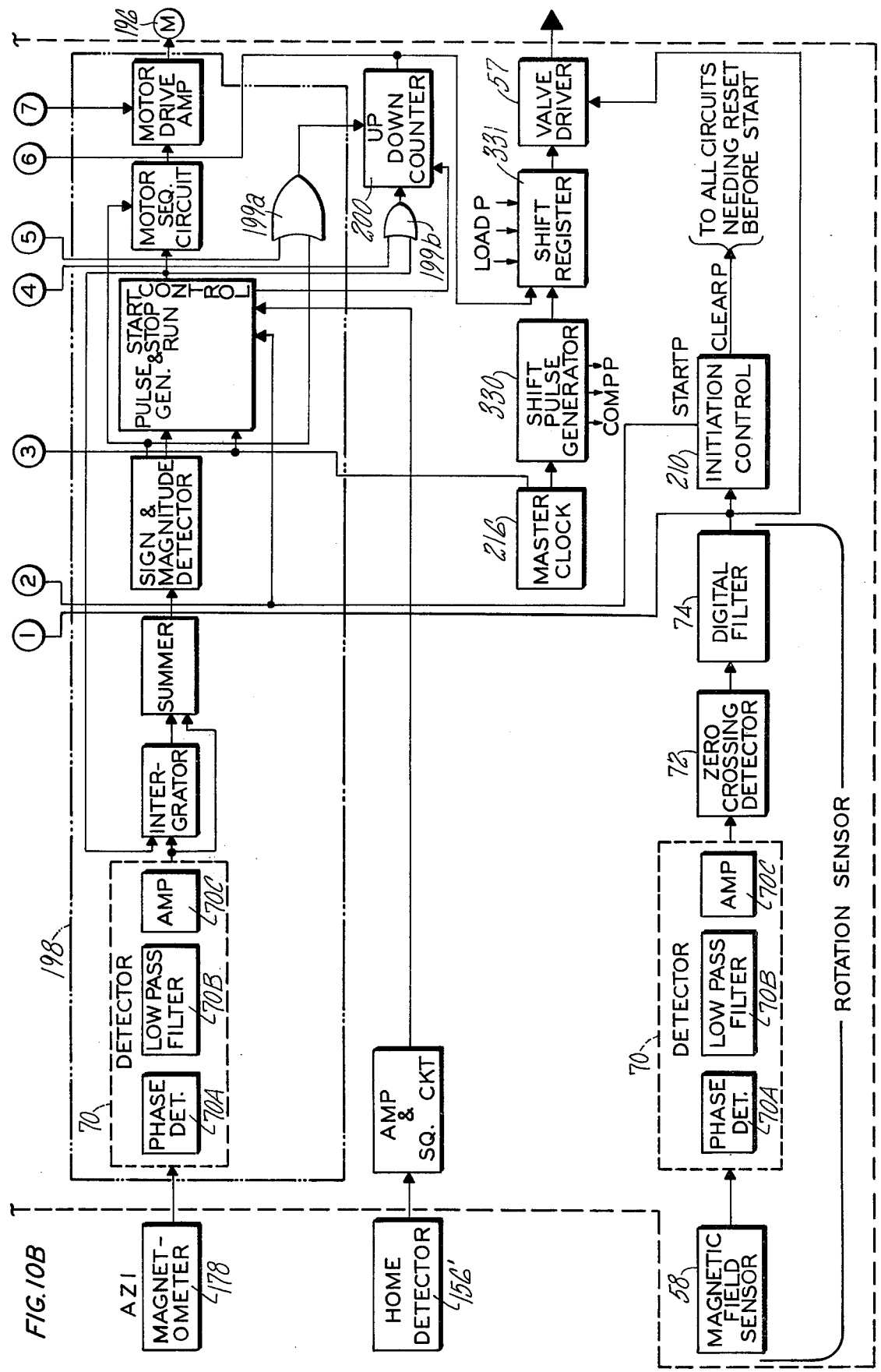
Figure 11A:
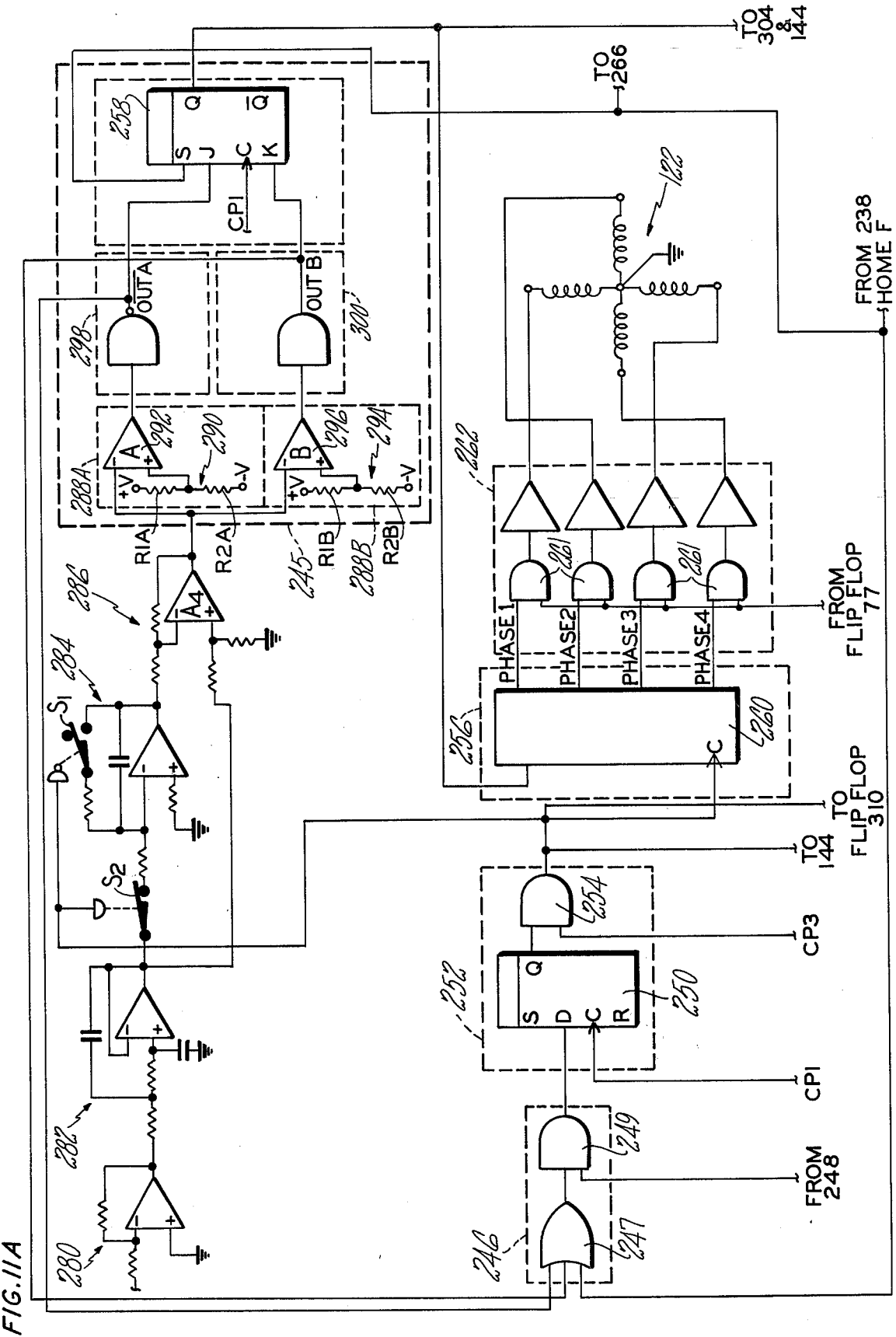
Figure 11B:
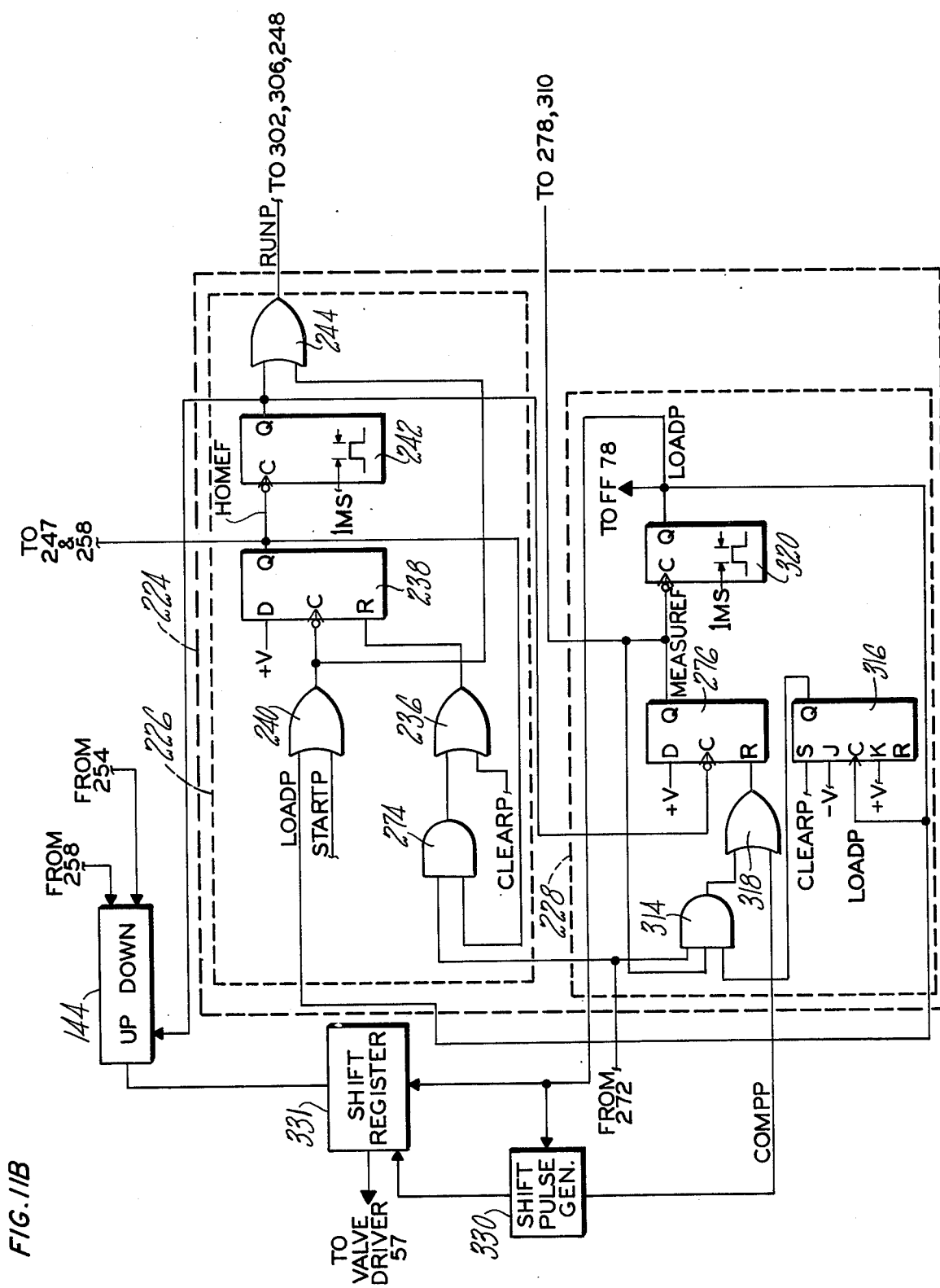

Referring now to FIGS. 10 and 11, a block diagram and a schematic, respectively, of the control system of the present invention is shown. FIG. 10 is a block diagram of the entire control system, including the rotation sensor circuit of FIG. 5 and the motor drive controls 120, 172 and 198 for the reference angle measuring circuit, the inclination angle measuring circuit and the azimuth angle measuring circuit, respectively. Motor drive controls 120 and 172 are identical, while motor drive control 198 differs only to the extent that some of the components at the beginning of the circuit are different due to the fact that the azimuth error signals are obtained from magnetometer 178 while the reference and inclination signals are obtained from error transducing accelerometers 116 and 148. The schematic of FIG. 11 shows one of the two identical motor drive controls 120 and 172, and the different structure found in motor drive control 198 will be pointed out hereinafter.

Referring to FIG. 10, the rotation sensor is shown, including magnetometer 58, detector 70 (comprised of phase detector 70A, low pass filter 70B and amplifier 70C), zero crossing detector 72, and digital filter 74 comprised of clock 76, comparator 78 and flip-flop 80, see FIG. 5A.

Figure 12:
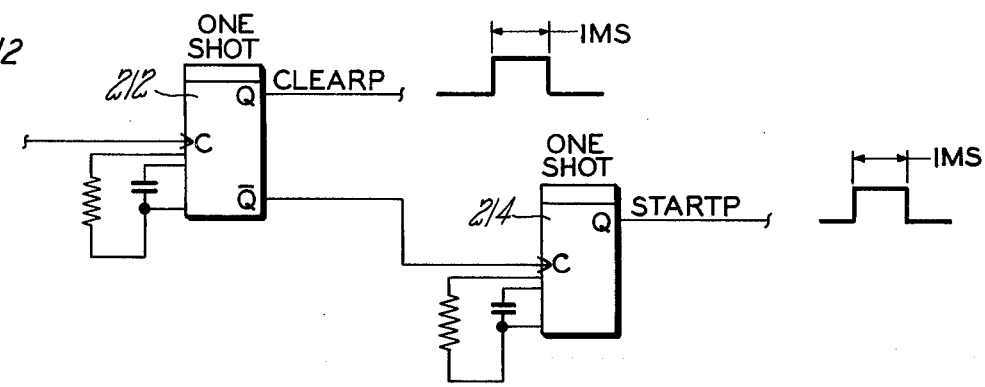
FIG. 12 is a schematic showing of the initiation control of FIG. 10B.

As described above with respect to FIGS. 5 and 6, the sensing of the condition of no rotation (or a predetermined low rate of rotation of the drill string) results in flip-flop 77 being set. The rising edge of the Q output of flip-flop 77 is delivered to an initiation control unit 210 to condition and start the operation of the control unit 121. Initiation control 210 (see FIG. 12) is made up of two one shot multivibrators 212 and 214. The rising edge of the Q output of flip-flop 77 triggers one shot 212 to generate a pulse of 1ms duration at the Q output of one shot 212. This output pulse at the Q output of one shot 212 is a clearing pulse (CLEARP) which, as will be described hereinafter, goes to the reset side of several devices in the control system to insure that the entire control system 121 is prepared for a start command. The $\overline{Q}$ output of one shot 212 is connected to the input of one shot 214 whereby one shot 214 is triggered by the trailing edge of the pulse of one shot 212 to generate a 1ms pulse which serves as a start command (STARTP) for the system. As will be described hereinafter, STARTP is delivered to various components in the control system to initiate the operation of the control system.

Figure 13:
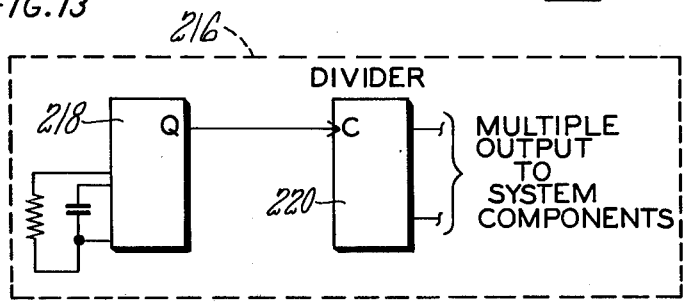
FIG. 13 is a schematic showing of the master clock of FIG. 10B.
Figure 13A:
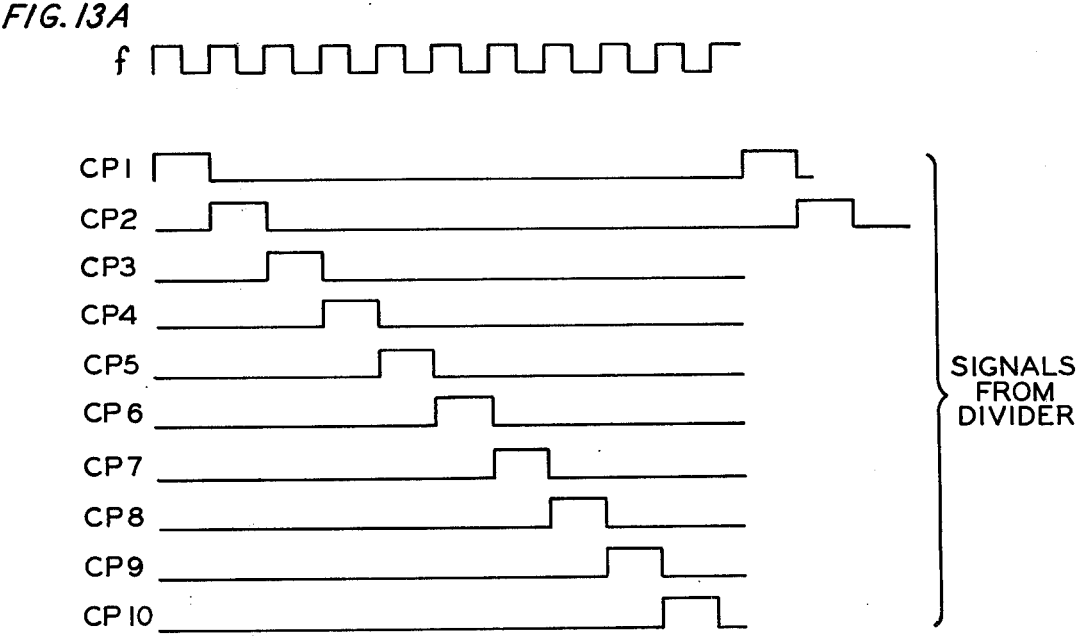
FIG. 13A shows the output pulses of the master clock and divider circuit.

In addition to the STARTP pulse which is delivered to the several components in the system, a master clock 216 also delivers timing pulses or timing signals to the control system. Referring to FIG. 13, the master clock 216 includes a free running a stable multivibrator 218, the output of which is delivered to a counter/divider 220 where the multivibrator output is divided down to provide the basic timing pulses for delivery to various components in the system. FIG. 13A shows the multivibrator output or frequency ($f$) and the output pulses CP1–CP10 from master clock 216 which are delivered to various components in the system for timing purposes.

The control system will now be described in connection with the determination of the reference angle R. It will be understood that the same description is applicable to the inclination angle I and, except as otherwise noted, also to the azimuth angle A. The description will be presented with joint reference to FIGS. 10 and 11. References to "high", "up" and logic 1 states of system components will be understood to be equivalents, as will "low", "down" and logic 0.

HOME MODE OPERATION

When initiation control 210 is triggered, the clearing pulse (CLEARP) is delivered to several components of START/STOP/RUN circuitry of pulse generator and control unit 222. Pulse generator and control unit 222 includes a start circuit 224, which has a home subcircuit 226 and a measure subcircuit 228, a run circuit 230, a done circuit 232 and a stop circuit 234.

Referring first to start circuit 224, in FIG. 11, a clear pulse (CLEARP) from initiation control 210 is delivered to an OR gate 236 and passes through the OR gate to a D type flip-flop 238 to reset the flip-flop. Flip-flop 238 may also sometimes be referred to as the home flip-flop since it is involved in determining the home position to which the reference accelerometer 116 is first driven, as described above. The start pulse (STARTP) from initiation control 210 is then delivered to an OR gate 240 and passes through OR gate 240 to flip-flop 238, and STARTP is also delivered to OR gate 244. The pulse STARTP is inverted at the delivery to flip-flop 238, and hence the trailing edge of the STARTP pulse sets flip-flip 238, since the D type flip-flop requires a rising signal to set. When flip-flop 238 is set, its Q output goes high, and constitutes a signal which will sometimes be referred to as HOMEF. The set condition of flip-flop 238 is the home mode. The Q function (HOMEF) of flip-flop 238 is delivered to several places in the system. For one, HOMEF goes to a single shot multivibrator 242 in the home circuit, but it does not trigger one shot 242 until the trailing edge of the HOMEF signal appears, which is later on in the operation of the system when accelerometer 116 is driven home. The pulse HOMEF is also delivered to a magnitude detecting circuit 246 in a sign and magnitude detector 245, and more particularly to an OR gate 247 in magnitude detecting circuit 246. This HOMEF signal overrides any other singal to OR gate 247, and it is delivered to an AND gate 249 to constitute one of the two inputs to AND gate 249. When the second input is delivered to AND gate 249 along with the HOMEF signal, pulses will be generated to drive the reference accelerometer to its home position.

The second input to AND gate 249 is delivered from run circuit 230 which has received an input from OR gate 244. The input from OR gate 244 is the result of STARTP which passes through gate 244 and appears at the output of gate 244 as a RUNP signal, which is then delivered to the S input of a JK type flip-flop 248 in run circuit 230. Flip-Flop 248 (sometimes referred to as the run flip-flop) was previously reset by a CLEARP pulse from the initiation control, so that the RUNP signal at the S terminal of flip-flop 248 unconditionally sets flip-flop 248 so that the Q output is high and is delivered to AND gate 249 as the second input to AND gate 249. Upon the delivery of the necessary two input signals to AND gate 249, an output signal is delivered from AND gate 249 to the D input of a D type flip-flop 250 in pulse generator circuit 252. The C input of flip-flop 250 receives clock pulses CP1 from master clock 216, and flip-flop 250 is set (D input transferred to Q) when its D input is at the logic 1 level (the input from gate 249) in the presence of the clock pulses CP1. Thus, flip-flop 250 is set at a frequency determined by the clock pulses CP1 when its D input is at a logic 1. At each setting of flip-flop 250, the Q output is delivered to an AND gate 254 in pulse generator 252 where it is gated with a second signal CP3 from master clock 216. The two inputs to AND gate 254 result in a pulsed output from gate 254. This pulsed output is delivered to several locations in the system, one such location being motor sequence circuit 256 to drive motor 122. The output of AND gate 254, and hence the output from pulse generator 252, is thus a series of step pulses delivered to the motor sequence circuit.

The HOMEF signal (resulting when the Q output of flip-flop 238 is high) is also delivered to the S input of a JK-type flip-flop 258 in sign and magnitude detector 245. The HOMEF signal at the S input to flip-flop 258 sets flip-flop 258 so that the Q output is high. The high Q output of flip-flop 258 is also delivered to motor sequence circuit 256 where it constitutes and serves as a sign or direction indicator to cause motor rotation in one predetermined direction (assumed counterclockwise) to drive reference accelerometer 116 to its home position.

From the foregoing it can be seen that two separate signals are delivered to motor sequence circuit 256. One of these signals is the step pulses from pulse generator 252, and the other of these signals is the sign or direction signals from flip-flop 258 in sign and magnitude detector 245.

Motor sequence circuit 256 is a 2 bit up/down counter 260. It receives the step pulses from pulse generator 252 and sign information from flip-flop 258 in sign and magnitude detector 245, and it converts these inputs into a four phase signal. That is, the motor sequence circuit is a phase generator for a four phase motor. The four phase signal is delivered on separate lines to motor drive amplifier 262 which has separate amplifiers and level converters for converting the four phase signals from sequence circuit 256 into an appropriate power level for driving the four phase step motor 122. Before being delivered to the separate amplifiers in motor drive amplifier 262, each phase is delivered to an AND gate 261, and the second or arming input to AND gate 261 is the Q output of flip-flop 77 of digital filter 74. Thus the drive motor 122 is not operated unless there is present both a no rotation signal from digital filter 74 and pulses from pulse generator 252. In the presence of both signals to AND gate 261, the reference accelerometer is thus driven toward the home position, and it will be noted that the direction of rotation to the home position is always the same (assumed counterclockwise) since the sign or direction information from flip-flop 258 is always at the same level for a home mode operation.

Motor 122 runs until home detector 128 receives light from light source 126. Light entering home detector 128 is amplified and converted to logic levels in an amplifier and squaring circuit 264, the output of which is delivered as the second input to an AND gate 266 in stop circuit 234. The first input to AND gate 266 is already present in the form of the HOMEF signal from flip-flop 238 of start circuit 224. The output of AND gate 266 goes high upon the delivery of the signal from amplifier and squaring circuit 264, and this output is delivered to and passes through an OR gate 268 causing the output of OR gate 268 to go high. This resultant signal from OR gate 268 is delivered to an AND gate 270 in run circuit 230 where it is gated with clock signal CP9. The output from AND gate 270 is inverted and delivered to the C input of JK type flip-flop 248 to reset flip-flop 248 on the trailing edge of CP9, thus causing the Q output of flip-flop 248 to go low. This resetting of flip-flop 248 removes one of the two inputs to AND gate 249 in magnitude detecting circuit 246 whereby the D input to flip-flop 250 is removed so that flip-flop 250 is reset and no further pulses are generated from pulse generator 252, whereby motor 122 stops because the predetermined home position has been reached.

The above described home mode of operation takes place simultaneously for all three axes of reference inclination and azimuth. Each of the motor control circuits 120, 172 and 198 has a run flip-flop 248. The Q output of each run flip-flop 248 is connected to a three input AND gate 272 in a common done circuit 232. When each of the three run flip-flops 248 is reset, the $\overline{Q}$ output of each goes high. When the $\overline{Q}$ output of each of the three flip-flops 248 is high, the output of AND gate 272 goes high to constitute a DONE signal indicating that accelerometers 116 and 148 and magnetometer 178 have all been driven to their respective home positions. This DONE signal at the output of gate 272 is delivered as one of the two inputs to an AND gate 274 in home subcircuit 226 of start circuit 224. The second input to AND gate 274 is provided by the HOMEF signal, and thus a signal is passed through AND gate 274 and is delivered to OR gate 236. The signal passes through OR gate 236 and is delivered to the R input of flip-flop 238 to reset flip-flop 238. When flip-flop 238 resets, its Q output goes to logic O and causes one shot 242 to fire for 1 ms, i.e. one shot 242 is triggered on the trailing edge of the HOMEF signal. The 1 ms output pulse from one shot 242 is delivered to up/down counter 144 to reset counter 144 so that counter 144 is now cleared to receive measuring pulses. The pulsed output from one shot 242 also causes a pulse to be passed through OR gate 244 whereby the RUNP pulse again appears at the output of gate 244 and is delivered to again set run flip-flop 248 in run circuit 230 in the same manner as flip-flop 248 was set during the home mode operation. When flip-flop 248 is set, the Q output goes high and is delivered again to AND gate 249 in magnitude detector circuit 246 to enable AND gate 249. However, it will be noted that in this mode of operation the HOMEF signal has been removed, and thus no signal is passed through AND gate 249 until OR gate 247 receives an input from some other part of the circuitry of sign and magnitude detector 245. Thus, the passing of the DONE signal from gate 272 terminates the HOMEF signal in each of the motor control circuits, 120, 172 and 198, whereby the pulse generator output is temporarily terminated to await further activation even though the Q output from run flip-flop 248 is up and has been delivered as one of the inputs to AND gate 249. The home mode operation is thus completed.

MEASURE MODE OPERATION

The pulse from one shot 242 is also inverted and delivered to the C input of a D type flip-flop 276, and flip-flop 276 is set on the trailing edge of the pulse from one shot 242. The Q output of flip-flop 276 thus goes high to constitute a MEASUREF signal and is delivered, inter alia, as one input to an AND gate 278 in stop circuit 234. Gates 278 and 268 combine to constitute an AND/OR gate structure. The MEASUREF signal is also delivered to the D input of D type flip-flop 310 to arm flip-flop 310. The system is now set for operation in a measure mode as determined by error signals from accelerometer 116.

Assuming that reference accelerometer 116 is now in any position other than its null position, an error signal will be generated and delivered to amplifier 280. As indicated in FIG. 8, this error signal is a current whose magnitude is a cosine function of the angle of the accelerometer's sensitive axis with respect to the force of gravity. Amplifier 280 is a high gain amplifier of the type LM107, and the amplifier circuit can be found in *Linear Applications Handbook*, 1973 edited by M. K. Vander Kooi, National Semiconductor Application Note AN20-5, February 1969, FIG. 13. In this amplifier circuit the current is amplified and converted to a voltage for further use in the system.

The amplified signal from amplifier circuit 280 is then delivered to a filter circuit 282 to remove high frequency components on the signal which may be introduced by the step motors and ambient vibrations. The filter is a two pole filter with a break frequency of 3 hertz with a type LM107 amplifier, and may be found in *Linear Applications Handbook*, 1973 edited by M. K. Vander Kooi, National Semiconductor, Inc. Note AN5-10, April 1968, FIG. 25.

The filtered signal from filter circuit 282 is then delivered to and integrated in an integrator circuit 284. The amplifier in integrator circuit 284 is an LM107 type, switches $S_1$ and $S_2$ are semiconductor switches such as RCA CD4016, and for further details of such integrator circuits see *Operational Amplifiers, Design and Applications*, by Tobey, Graeme, and Hunlsman, FIG. 6.15, McGraw-Hill, 1971. The integrator functions to enlarge the error from accelerometer 116 as a function of time in order to examine and process small errors. The integrator is reset by feeding back the output from pulse generator 252 to semiconductor switches $S_1$ and $S_2$ to reset the integrator to zero by alternately closing and opening switches $S_1$ and $S_2$ with the signal from the pulse generator each time step motor 122 is stepped, one switch being open when the other is closed.

The filtered signal from filter 282 and the integrated signal from integrator 284 are both delivered to a summing circuit 286 where the filtered signal and the integrated signal are algebraically added. Thus, even if the error signal from filter 282 is small, the integrated error signal will be available for processing in the rest of the system. For further reference to the summer circuit, see National Semiconductor, Inc. Note A and 20-3, February 1969, FIG. 3 (*Linear Applications Handbook*, 1973 edited by M. K. Vander Kooi). The output from summer circuit 286 is then delivered to sign and magnitude detector 245 to be examined for both sign and magnitude. The magnitude is commensurate with the degree or magnitude of error between the instantaneous position of the reference accelerometer and the null position, and the sign is commensurate with the direction of rotation which is necessary in order to drive the reference accelerometer to the null position.

Sign and magnitude detector 245 has a comparator circuit 288A and a comparator circuit 288B. Comparator circuit 288A has a voltage divider 290 comprised of resistors R1A and R2A connected as shown to amplifier 292; and comparator circuit 288B has a similar voltage divider 294 comprised of resistors R1B and R2B connected as shown to amplifier 296. Amplifiers 292 and 296 are both high gain differential amplifiers. The output from summer 286 is delivered to amplifier 292 and the output from summer 286 is also delivered to amplifier 296. Voltage divider 290 establishes a first reference voltage, reference A, for differential amplifier 292, and voltage divider 294 establishes a second reference voltage, reference B, for differential amplifier 296. The comparator circuit functions to compare the output of summer 286 with the reference voltages. Referring to FIGS. 14A, 14B and 14C, when the output from summer 286 is more positive than the reference A voltage, the output (OUTA) from amplifier 292 is negative. Similarly, when the output from summer 286 is more negative than the voltage level of reference B, then the output (OUTB) of amplifier 296 is positive. As the result of this operation of comparator circuits 288A and 288B, OUTA and OUTB are signals such as shown in FIGS. 14B and 14C.

The outputs from comparators 288A and 288B are fed to inverting buffer 298 and non-inverting buffer 300, respectively. The buffers serve to shift the levels of the voltages from the comparators to a voltage level compatible with flip-flop 258 to which the buffer outputs are delivered. The signal $\overline{\text{OUTA}}$ (shown in FIG. 14D) is delivered to the J terminal of flip-flop 258, while the signal OUTB is delivered to the K terminal of flip-flop 258. Also, the outputs of buffers 298 and 300 are delivered to OR gate 247, OR gate 247 being in magnitude detector circuit 246. Thus, the signals OUTB and $\overline{\text{OUTA}}$ (see FIG. 14E) are delivered to OR gate 247.

Referring again to flip-flop 258, timing pulses CP1 from master clock 216 are delivered to the C input whereby whichever of the signal $\overline{\text{OUTA}}$ at the J input or the signal OUTB at the K input is present whenever a timing pulse CP1 is received will be set into the flip-flop. Thus, from signal diagrams 14B through 14E, it can be seen that flip-flop 258 will set (Q output high) when OUTA is negative ($\overline{\text{OUTA}}$ positive) in the presence of clock pulses CP1; and flip-flop 258 will be reset (Q output low) whenever OUTB is positive in the presence of clock pulses CP1. Recalling that the Q output of flip-flop 258 is delivered to motor sequence circuit 256 to control the direction of rotation of motor 122 depending on the level of the Q output signal of flip-flop 258, it can thus be seen that motor 122 will be driven either clockwise or counterclockwise depending on the outputs of comparators 288A and 288B. Thus, reference accelerometer 116 is driven in the appropriate direction to reduce the error signal from accelerometer 116 and drive accelerometer 116 to its null position.

The OUTA signal (inverted to $\overline{\text{OUTA}}$) and the OUTB signal delivered to OR gate 247 of magnitude detector circuit 246 serve to determine the magnitude of the error signal from accelerometer 116. As illustrated in the signal diagrams 14A through 14E, whenever OUTB or $\overline{OUTA}$ is high, the signal from summer 286 is outside the bounds defined in FIG. 14A, i.e., below reference B and above reference A. Hence, the area below reference A and above reference B in FIG. 14A defines a null band; and whenever the error is in excess of this null band, i.e., above reference A or below reference B, a signal is passed through OR gate 247 and is delivered to AND gate 249 to constitute the second input to AND gate 249. The first input to AND gate 249 is already present in the form of the high Q output from run flip-flop 248. Thus, in the manner previously described, a signal is passed by AND gate 249 to set flip-flop 250, flip-flop 250 being set when the D input is at a logic 1 in the presence of the clock pulses CP1. As previously described with respect to the home mode operation, the set Q output of flip-flop 250 is then gated with the clock pulses CP3 in AND gate 254 whereby step pulses are delivered to motor sequence circuit 256 to be gated with the high Q output of flip-flop 77 at gate 261 to drive motor 122. Motor 122 will continue to drive as long as the step pulses are received from pulse generator 252, i.e., until accelerometer 116 is driven to its null position at which point the output from summer 286 is commensurate with the null described above.

The outputs from flip-flop 258 of sign and magnitude detector 245 and the pulsed output from pulse generator 252 are also both delivered to up/down counter 144 for algebraic summing to determine the net number of stepping pulses delivered to motor 122 to drive accelerometer 116 to its null position.

As will be apparent, the signal diagrams shown in FIGS. 14A through 14E are only for purposes of illustration, and they approximate a condition in which accelerometer 116 would actually be hunting or oscillating back and forth across its null position. For other conditions commensurate with error, an OUTA or OUTB signal would be present, but it would not be regular in time.

As previously described, run flip-flop 248 was reset upon delivery of a signal from stop circuit 234 to run circuit gate 270 in the presence of clock pulse CP9 to gate 270. As also previously described, the signal from stop circuit 234 occurred upon the concurrent delivery to gate 266 of a signal from home detector 128 (through amplifier and squaring circuit 264) and the HOMEF signal from flip-flop 238. In the measure mode, the signal HOMEF has been terminated, and thus the signal from stop circuit 234 to reset run flip-flop 248 must be generated in another manner. In the measure mode, flip-flop 276 of measure circuit 228 has been set so that the signal MEASUREF is delivered to form one input to AND gate 278 in stop circuit 234. When a second input is also present at AND gate 278, a signal will be passed through AND gate 278 and through OR gate 268 to be delivered to AND gate 270 whereby run flip-flop 248 will be reset on the concurrence of clock pulse CP9. This second input to AND gate 278 is supplied from counter 302 which delivers a signal to AND gate 278 when the counter has overflowed.

There are two ways to load pulses into counter 302. First, if there is a sign change from sign and magnitude detector 245, the Q output of flip-flop 258 will change between low and high. The Q output of flip-flop 258 is connected as one of the inputs to an AND gate 304, and the other input to AND gate 304 is obtained from the $\overline{Q}$ output of a flip-flop 306. Flip-flop 306 will have been reset by the RUNP pulse so that its $\overline{Q}$ output is high, and thus a signal will pass through AND gate 304 each time the Q output of flip-flop 258 goes high in accordance with a sign change. The output from gate 304 passes through an OR gate 308 and is delivered to counter 302. When counter 302 overflows, a signal is delivered from counter 302 to AND gate 278 which coincides with the MEASUREF signal to gate 278 whereby gate 278 passes a signal to OR gate 268 and hence to gate 270. The signal thus delivered to gate 270 will, in the presence of the clock pulses CP9, reset flip-flop 248 whereby the Q input from flip-flop 248 to gate 249 of the magnitude detector is removed. The removal of the input to gate 249 terminates the operation of pulse generator 252 whereby stepping of motor 122 is terminated. Thus, stepping of motor 122 can be terminated in a "sign forced" stop mode when the sign of the error signal from accelerometer 116 changes a predetermined number of times. That would, of course, occur when accelerometer 116 has reached and is hunting across its null position.

Flip-flop 248 can also be reset and hence the stepping of motor 122 terminated, if no pulses are generated by pulse generator 252 for a predetermined period of time. This condition, which may be referred to as a "time forced" stop mode, is accomplished by means of D type flip-flop 306 (previously described) and D type flip-flop 310. The MEASUREF signal from flip-flop 276 is delivered to the D input of flip-flop 310 to enable flip-flop 310. Also, a timing stop signal CPN (a derivative of the master clock output) is delivered to the C input of flip-flop 310 to clock the flip-flop, and the R terminal of flip-flop 310 is connected to receive the output pulses from pulse generator 252. Flip-flop 310 will set each time a zero to one transition is received on the clock input terminal C, and will reset each time a pulse is received at terminal R from pulse generator 252. The companion flip-flop 306 is reset once at the beginning of the measure mode by the RUNP signal connected to the R terminal. The C terminal of flip-flop 306 is also connected to receive the CPN signal from the master clock, and flip-flop 306 will set on the leading edge of CPN if the D enable input of flip-flop 306 is high, a condition which occurs if flip-flop 310 is set when flip-flop 306 receives the leading edge of CPN. When flip-flop 306 is set, it provides one of the inputs to an AND gate 312, the other input to which is in the form of pulses CP1 from the master clock. The pulses CP1 are thus passed through gate 312 and through gate 308 to counter 302. Thus, a burst of pulses are delivered to counter 302 to cause counter 302 to overflow whereby a signal is passed through gate 278 and through gate 268 to be delivered to gate 270. The signal thus delivered to gate 270 coincides with the CP9 clock input to reset flip-flop 248 whereby gate 249 is disabled and the output from pulse generator 252 is terminated. Thus, the stepping of motor 122 is terminated because accelerometer 116 is at its null position.

The $\overline{Q}$ output of flip-flop 248 is connected to gate 272 of done circuit 232. When flip-flop 248 is reset, commensurate with the termination of the operation of motor 122, the $\overline{Q}$ signal is delivered to gate 272. When similar $\overline{Q}$ signals have been delivered to gate 272 from all three axes (i.e. the commensurate run flip-flops) and all three flip-flops have been reset to terminate operation of their respective motors, a DONE signal will be passed through gate 272 and will be delivered to gate 274 in home segment circuit 226 and also to three input AND gate 314 in measure circuit 228. Three way AND gate 314 is also receiving the MEASUREF signal, so that it is receiving two of the three inputs necessary to pass a signal. A first pass flip-flop 316 of the JK-type in measure circuit 228 has previously been set by CLEARP whereby the Q output of flip-flop 316 is high. The Q output of flip-flop 316 is connected to and constitutes the third input to gate 314, whereby the DONE signal from gate 272 will pass through gate 314 if this is the first occurrence of the DONE signal since the start pulse STARTP was received. The signal passed through AND 314 then passes through OR gate 318 and is delivered to the R input of flip-flop 276 to reset flip-flop 276 and thus terminate the MEASUREF signal. Upon the resetting of flip-flop 276 the trailing edge of MEASUREF triggers a one shot LOAD multivibrator 320 to generate a 1 ms pulse from one shot 320, identified as LOADP. The LOADP signal is delivered to shift register 331 to enable the jam inputs of the shift register whereby the information stored in each of the up/-down counters 144, 176 and 200 is parallel transferred into the shift register. The pulse LOADP is also delivered to flip-flop 316 to reset flip-flop 316, and the LOADP pulse is also delivered through OR gate 240 to set home flip-flop 238. The LOADP pulse passing through OR gate 240 is also delivered to OR gate 244 to create another RUNP pulse. This RUNP pulse again sets run flip-flop 248 to cause the system to again run in the home mode previously described.

The control system will thus repeatly run through cycles of home mode and measure mode operation until operation of the control system is terminated when rotation of the drill string is again resumed. The repetitive cycling through the home mode and measure modes of operation will be as described above with the exception that flip-flop 276 will not be reset on the subsequent cycling of the system by the DONE signal from gate 272 because the pulse LOADP will have reset flip-flop 316 to produce a logic low at the Q output of gate 316, thus removing one of the necessary inputs at gate 314. On these subsequent cyclings of the system, flip-flop 316 will reset only upon receipt of a completion signal (COMPP) from a shift pulse generator 330 delivered to OR gate 318. Operation of the shift pulse generator is started by the LOADP pulse.

The first pass flip-flop 316 is needed in the system because shift pulse generator 330 does not operate until completion of the first cycle of the system; and therefore a one time pulse is needed to recycle the system so a second set of measurements can be taken while the first information loaded into the shift register by the first LOADP signal is transferred to the surface. The shift pulse generator, which is merely a divider to subdivide master clock pulses, generates pulses to move the information out of shift register 331 to valve driver 57 which operates plunger 56. COMPP is generated after each $n$ pulses of pulse generator 330 equal the storage capacity of shift register 331.

As previously noted, the above description was for motor drive control 120, and the same description would also apply for the corresponding identical unit 172. Motor drive control unit 198 differs only in that amplifier 280 and filter 282 are replaced with a unit identical to detector 70 (including phase detector 70A, filter 70B and amplifier 70C) in order to receive and process the output of magnetometer 178. The output of detector 70 in motor drive control unit 198 is delivered to its associated integrator, and the entire remaining part of unit 198 is the same as and operates in the same way as motor drive control 120. A different set of clock pulses is delivered to and used in each of the three motor control units 120, 172 and 198 so that each unit operates sequentially in its MEASURE mode rather than the units operating simultaneously which might result in cross talk or interference in signals from the three units. That is, reference motor 122 is stepped one step, and then inclination motor 174 is stepped one step, and then azimuth motor 196 is stepped one step, and that sequential stepping process is then repeated until all three sensors have reached their null positions.

Each LOADP pulse is also delivered to the S input of flip-flop 78 (see FIG. 5A) to set flip-flop 78 whereby the Q output of flip-flop 78 goes high and constitutes one of the required inputs for AND gate 79. The other input for AND gate 79 is the inverted $\overline{Q}$ output of flip-flop 76. Thus, AND gate 79 will pass a signal when flip-flop 76 is set (commensurate with a resumed state of rotation) and LOADP has been generated. This signal passed by AND gate 70 causes the K input of flip-flop 77 to go high, whereby a rising edge of the clock pulse CPN will reset flip-flop 77 so that the Q output of flip-flop 77 goes low (level X of FIG. 6C) to signal return to the state of rotation. The recurrence of this low state of the Q output of flip-flop 77 then terminates operation of the step motors 122, 174 and 196 by removing one of the inputs to the AND gate 261 in each motor drive circuit 256 and also by disarming valve driver 57.

The HOME and MEASURE cycling described above will then persist for each of reference accelerometer 116, inclination accelerometer 148 and azimuth magnetometer 178, until the rotation sensor logic detects drill string motion or power is removed from the system due to loss of generator power which, for example, could occur when mud flow is stopped.

While preferred embodiments have been shown and described, various modifications and substitutions may be made thereto without departing from the spirit and scopes of the invention. Accordingly, it is to be understood that the present invention has been described by way of illustration and not limitation.

What is claimed is:

1. Sensor apparatus for measuring directional parameters of a drill string in a borehole, the sensor apparatus including:
   first gimbal means mounted for rotation in a segment of a drill string, said first gimbal means being rotatable about the axis of the drill string segment or an axis parallel to the drill string axis;
   first gravity responsive means mounted on said first gimbal means for generating first alignment signals as a function of gravity forces on said first gravity responsive means, said first alignment signals varying as a function of the alignment of said first gravity responsive means with respect to the direction of the force of gravity;
   second gimbal means mounted for rotation in said drill string segment, said second gimbal means being rotatable about an axis perpendicular to the axis of rotation of said first gimbal;
   second gravity responsive means mounted on said second gimbal means for generating second alignment signals as a function of gravity forces on said second gravity responsive means, said second alignment signals varying as a function of the alignment of said second gravity responsive means with respect to the direction of the force of gravity;

third gimbal means mounted for rotation in said drill string segment, said third gimbal means being rotatable about an axis perpendicular to an axis perpendicular to the axis of rotation of said first gimbal;

magnetic responsive means mounted on said third gimbal means for generating third alignment signals as a function of magnetic field forces on said magnetic responsive means, said third alignment signals varying as a function of the alignment of said magnetic responsive means with respect to the direction of the earth's magnetic field;

first motor means connected to said first gimbal means for driving said first gravity responsive means to a first predetermined position and then to a second position having a predetermined alignment with respect to the direction of the force of gravity as determined by said first alignment signals;

first detector means for determining when said first gravity responsive means is at its first predetermined position and generating a first home signal;

first control means for operating said first motor means, said first control means receiving said first home signal to terminate the drive of said first gravity responsive means to the first predetermined position thereof, said first control means then driving said first gravity responsive means to said second position thereof, said first control means receiving said first alignment signals to determine when said second position has been reached, the net movement of said first gravity responsive means from said first position thereof to said second position thereof being commensurate with a first directional parameter of the drill string;

second motor means connected to said second gimbal means for driving said second gravity responsive means to a first predetermined position and then to a second position having a predetermined alignment with respect to the direction of the force of gravity as determined by said second alignment signals;

second detector means for determining when said second gravity responsive means is at its first predetermined position and generating a second home signal;

second control means for operating said second motor means, said second control means receiving said second home signal to terminate the drive of said second gravity responsive means to the first predetermined position thereof, said second control means then driving said second gravity responsive means to said second position thereof, said second control means receiving said second alignment signals to determine when said second position has been reached, the net movement of said second gravity responsive means from said first position thereof to said second position thereof being commensurate with a second directional parameter of the drill string;

third motor means connected to said third gimbal means for driving said magnetic responsive means to a first predetermined position and then to a second position having a predetermined alignment with respect to the direction of the earth's magnetic field as determined by said third alignment signals;

third detector means for determining when said magnetic responsive means is at its first predetermined position and generating a third home signal; and third control means for operating said third motor means, said third control means receiving said third home signal to terminate the drive of said magnetic responsive means to the first predetermined position thereof, said third control means then driving said first magnetic responsive means to said second position thereof, said third control means receiving said third alignment signals to determine when said second position has been reached, the net movement of said magnetic responsive means from said first position thereof to said second position thereof being commensurate with a third directional parameter of the drill string.

2. Sensor apparatus as in claim 1 wherein:

said first gravity responsive means is error transducing accelerometer means having a sensitive axis with respect to the direction of gravity forces;

said second gravity responsive means is error transducing accelerometer means having a sensitive axis with respect to the direction of gravity forces; and said magnetic responsive means is magnetometer means having a sensitive axis with respect to the direction of the earth's magnetic field.

3. Sensor apparatus as in claim 2 wherein:

said first gravity responsive means is a first force balance accelerometer having its sensitive axis perpendicular to the axis of the drill string segment in the second position thereof:

said second gravity responsive means is a second force balance accelerometer having its sensitive axis perpendicular to the sensitive axis of the first force balance accelerometer in the second position of each accelerometer; and said magnetic responsive means is a fluxgate magnetometer having its sensitive axis perpendicular to the direction of the earth's magnetic field in the second position thereof.

4. Sensor apparatus as in claim 1 wherein:

said first directional parameter is the reference angle formed between a first plane containing the axis of the drill string segment and a known reference on the drill string segment and a second plane containing the drill axis and a vertical projection of the drill axis; and said second directional parameter is the angle of inclination of the axis of the drill string segment with respect to the vertical in a common vertical plane; and said third directional parameter is the azimuth angle between a vertical plane which contains the horizontal projection of the axis of the drill string segment and the vertical plane containing the horizontal projection of the direction of the local terrestrial magnetic field.

5. Sensor apparatus as in claim 1 wherein each of said first, second and third detector means includes:

light generating means, photoelectric receiving means, and light control means for delivering light from said light generating means to said photoelectric receiving means when the respective gravity or magnetic responsive means is in its first predetermined position.

6. Sensor apparatus as in claim 5 wherein:

said light control means includes aperatured disc means positioned between said light generating means and said light receiving means, said disc means being drivingly connected to the motor means associated with the respective gravity or magnetic responsive means.

7. Sensor apparatus as in claim 1 wherein:
said first, second and third motor means are each stepping motors.

8. Sensor apparatus as in claim 7 wherein each of said first, second and third control means includes:
pulse generating means for delivering pulses to the stepping motor associated with the control means; and
means for counting the net number of pulses delivered to the stepping motor to drive the associated gravity or magnetic responsive means from its first position to its second position, said net number of pulses being commensurate with the directional parameter of the drill string to be measured by the gravity or magnetic responsive means.

9. Sensor apparatus as in claim 1 wherein:
said second gimbal means is rotatably mounted in said first gimbal means; and
said third gimbal means is rotatably mounted on a rotatable shaft, said rotatable shaft being rotatably mounted in said first gimbal.

10. A sensor system as in claim 9 wherein:
said second gimbal means has an axis of rotation perpendicular to the axis of rotation of said first gimbal means; and
said rotatable shaft has an axis of rotation parallel to the axis of rotation of said second gimbal means; and
said third gimbal means has an axis of rotation perpendicular to the axis of rotation of said rotatable shaft.

11. A sensor system as in claim 10 wherein:
said first motor means is mounted on said drill string segment and is drivingly connected to said first gimbal means;
said second motor means is mounted on said first gimbal means and is drivingly connected to said second gimbal means and to said rotatable shaft; and
said third motor means is mounted on said first gimbal means and is drivingly connected to said third gimbal means.

12. A sensor system as in claim 1 wherein:
said first motor means is mounted on said drill string segment and is drivingly connected to said first gimbal means;
said second motor means is mounted on said first gimbal means and is drivingly connected to said second gimbal means; and
said third motor means is mounted on said first gimbal means and is drivingly connected to said third gimbal means.

13. A sensor system as in claim 12 including:
a rotatable support means for said third gimbal means; and
means drivingly connecting said second motor means to said rotatable support means to coordinate the position of said magnetic responsive means with the position of said second gravity responsive means.

14. A sensor system as in claim 13 wherein:
the axis of rotation of said rotatable support means is parallel to the axis of rotation of said second gimbal means; and
the axis of rotation of said rotatable support means and the axis of rotation of said second gimbal means are perpendicular to the axis of rotation of said first gimbal means; and
the axis of rotation of said third gimbal means is perpendicular to the axis of rotation of said rotatable support means.

15. Sensor apparatus as in claim 1 wherein:
said drill string segment is non-magnetic.

16. Sensor apparatus as in claim 15 wherein:
said sensor apparatus is contained in a non-magnetic housing mounted in said drill string segment.

17. Sensor apparatus as in claim 1 including:
means for transmitting to the surface information representative of the directional parameters determined by the sensor system.

18. Sensor apparatus as in claim 17 wherein:
said transmitting means is acoustical transmitting means for generating acoustical signals in a liquid in the drill string.

19. The method of measuring directional parameters of a drill string in a borehole, including the steps of:
rotating first gravity responsive means in a segment of the drill string to generate first alignment signals as a function of gravity forces on said first gravity responsive means, said first gravity responsive means being mounted on a first gimbal mounted for rotation in the drill string segment about the axis of the drill string segment or an axis parallel to the drill string axis, and said first alignment signals varying as a function of the alignment of said first gravity responsive means with respect to the direction of the force of gravity;
rotating second gravity responsive means in said drill string segment for generating second alignment signals as a function of gravity forces on said second gravity responsive means, said second gravity responsive means being mounted for rotation on a second gimbal having an axis of rotation perpendicular to the axis of rotation of the first gimbal, said second alignment signals varying as a function of the alignment of said second gravity responsive means with respect to the direction of the force of gravity;
rotating magnetic responsive means in said drill string segment to obtain third alignment signals as a function of magnetic field forces on said magnetic responsive means, said magnetic responsive means being mounted on a third gimbal rotatable about an axis perpendicular to an axis perpendicular to the axis of rotation of the first gimbal, and said third alignment signals varying as a function of the alignment of said magnetic responsive means with respect to the direction of the earth's magnetic field;
operating a driving motor connected to said first gimbal to drive said first gravity responsive means to a first predetermined position and then to a second position having a predetermined alignment with respect to the direction of the force of gravity as determined by said first alignment signals;
detecting when said first gravity responsive means is at its first predetermined position and generating a first home signal;

terminating the drive of said first gravity responsive means to the first position thereof upon receipt of said first home signal;

driving said first gravity responsive means to said second position after the first predetermined position thereof has been reached;

measuring the net movement of said first gravity responsive means from said first predetermined position thereof to said second position thereof to determine a first directional parameter of the drill string;

operating a driving motor connected to said second gimbal to drive said second gravity responsive means to a first predetermined position and then to a second position having a predetermined alignment with respect to the direction of the force of gravity as determined by said second alignment signals;

detecting when said second gravity responsive means is at its first predetermined position and generating a second home signal;

terminating the drive of said second gravity responsive means to the first position thereof upon receipt of said second home signal;

driving said second gravity responsive means to said second position after the first predetermined position thereof has been reached;

measuring the net movement of said second gravity responsive means from said first predetermined position thereof to said second position thereof to determine a second directional parameter of the drill string;

operating a driving motor connected to said third gimbal to drive said magnetic responsive means to a first predetermined position and then to a second position having a predetermined alignment with respect to the direction of the earth's magnetic field as determined by said third alignment signals;

detecting when said magnetic responsive means is at its first predetermined position and generating a third home signal;

terminating the drive of said magnetic responsive means to the first position thereof upon receipt of said third home signal;

driving said magnetic responsive means to said second position after the first predetermined position thereof has been reached; and measuring the net movement of said magnetic responsive means from said first predetermined position thereof to said second position thereof to determine a third directional parameter of the drill string.

20. The method of measuring directional parameters of a drill string in a borehole as in claim 19 wherein:

the step of rotating first gravity responsive means includes rotating error transducing accelerometer means having a sensitive axis with respect to the direction of gravity forces;

the step of rotating second gravity responsive means includes rotating error transducing accelerometer means having a sensitive axis with respect to the direction of gravity forces; and the step of rotating magnetic responsive means includes rotating magnetometer means having a sensitive axis with respect to the direction of the earth's magnetic field.

21. The method of measuring directional parameters of a drill string in a borehole as in claim 20 wherein:

the step of rotating first gravity responsive means includes rotating first force balance accelerometer means having a sensitive axis, the sensitive axis being aligned perpendicular to the axis of the drill string segment in the second position of said first force balance accelerometer means;

the step of rotating second gravity responsive means includes rotating second force balance accelerometer means having a sensitive axis, the sensitive axis being aligned perpendicular to the sensitive axis of the first force balance accelerometer means in the second position of each accelerometer means; and the step of rotating magnetic responsive means includes rotating fluxgate magnetometer means having a sensitive axis, the sensitive axis being aligned perpendicular to the direction of the earth's magnetic field in the second position of the magnetometer means.

22. The method of measuring directional parameters of a drill string in a borehole as in claim 19 wherein:

the step of measuring the net movement of the first gravity responsive means to determine a first directional parameter is the step of measuring the reference angle formed between a first plane containing the axis of the drill string segment and a known reference on the drill string segment and a second plane containing the drill axis and a vertical projection of the drill axis;

the step of measuring the net movement of the second gravity responsive means to determine a second directional parameter is the step of measuring the angle of inclination of the axis of the drill string segment with respect to the vertical in a common vertical plane; and the step of measuring the net movement of the magnetic responsive means to determine a third directional parameter is the step of measuring the azimuth angle between a vertical plane which contains the horizontal projection of the axis of the drill string segment and the vertical plane containing the horizontal projection of the direction of the local terrestrial magnetic field.

23. The method of measuring directional parameters of the drill string in a borehole as in claim 19 wherein:

the step of detecting when said first gravity responsive means is at its first predetermined position includes passing a light from a light source to a photoelectric detector;

the step of detecting when said second gravity responsive means is at its first predetermined position includes passing a light from a light source to a photoelectric detector; and the step of detecting when said magnetic responsive means is at its first predetermined position includes passing a light from a light source to a photoelectric detector.

24. The method of measuring directional parameters of a drill string in a borehole as in claim 23 wherein the step of passing light from each light source to each photoelectric detector includes:

rotating apertured disc means positioned between each light source and each photoelectric detector by driving connection between the apertured disc means and the driving motor associated with the respective gravity or magnetic responsive means.

25. The method of measuring directional parameters of the drill string in the borehole as in claim 19 wherein:

the step of operating each driving motor includes operating stepping motors.

26. The method of measuring directional parameters of a drill string in a borehole as in claim 25 wherein the steps of measuring the net movement of each of said first and second gravity responsive means and said magnetic responsive means includes:
generating and delivering pulses to the stepping motor associated with each of said gravity responsive means and magnetic responsive means; and
counting the net number of pulses delivered to the stepping motor to drive each gravity responsive means or magnetic responsive means from its first predetermined position to its second predetermined position, said net number of pulses being commensurate with the directional parameter of the drill string to be measured by the gravity or magnetic responsive means.

27. The method of measuring directional parameters of a drill string in a borehole as in claim 19 wherein:
the step of rotating said second gravity responsive means includes rotating said second gravity responsive means on a gimbal rotatably mounted in said first gimbal; and
the step of rotating said magnetic responsive means includes rotating said magnetic responsive means on a gimbal rotatably mounted on a rotatable shaft mounted in said first gimbal.

28. The method of measuring directional parameters of a drill string in a borehole as in claim 27 wherein:
said second gimbal has an axis of rotation perpendicular to the axis of rotation of said first gimbal;
said rotatable shaft has an axis of rotation parallel to the axis of rotation of said second gimbal; and
said third gimbal has an axis of rotation perpendicular to the axis of rotation of said rotatable shaft.

29. The method of measuring directional parameters of a drill string in a borehole as in claim 19 including the step of:
transmitting to the surface information representative of the directional parameters determined by the gravity responsive means and the magnetic responsive means.

30. The method of measuring directional parameters of a drill string in a borehole as in claim 19 including the step of:
transmitting to the surface information representative of the directional parameters determined by the gravity and magnetic responsive means by generating acoustical signals in a liquid in the drill string.

31. Sensor apparatus as in claim 8 wherein:
said first gravity responsive means is error transducing accelerometer means having a sensitive axis with respect to the direction of gravity forces;
said second gravity responsive means is error transducing accelerometer means having a sensitive axis with respect to the direction of gravity forces; and
said magnetic responsive means is magnetometer means having a sensitive axis with respect to the direction of the earth's magnetic field.

32. Sensor apparatus as in claim 31 wherein:
said first gravity responsive means is a first force balance accelerometer having its sensitive axis perpendicular to the axis of the drill string segment in the second position thereof;
said second gravity responsive means is a second force balance accelerometer having its sensitive axis perpendicular to the sensitive axis of the first force balance accelerometer in the second position of each accelerometer; and
said magnetic responsive means is a fluxgate magnetometer having its sensitive axis perpendicular to the direction of the earth's magnetic field in the second position thereof.

33. Sensor apparatus as in claim 8 wherein:
said first directional parameter is the reference angle formed between a first plane containing the axis of the drill string segment and a known reference on the drill string segment and a second plane containing the drill axis and a vertical projection of the drill axis; and
said second directional parameter is the angle of inclination of the axis of the drill string segment with respect to the vertical in a common vertical plane; and
said third directional parameter is the azimuth angle between a vertical plane which contains the horizontal projection of the axis of the drill string segment and the vertical plane containing the horizontal projection of the direction of the local terrestrial magnetic field.

34. Sensor apparatus as in claim 8 wherein each of said first, second and third detector means includes:
light generating means, photoelectric receiving means, and light control means for delivering light from said light generating means to said photoelectric receiving means when the respective gravity or magnetic responsive means is in its first predetermined position.

35. Sensor apparatus as in claim 34 wherein:
said light control means includes apertured disc means positioned between said light generating means and said light receiving means, said disc means being drivingly connected to the motor means associated with the respective gravity or magnetic responsive means.

36. Sensor apparatus as in claim 8 wherein:
said second gimbal means is rotatably mounted in said first gimbal means; and
said third gimbal means is rotatably mounted on a rotatable shaft, said rotatable shaft being rotatably mounted in said first gimbal means.

37. A sensor system as in claim 36 wherein:
said second gimbal means has an axis of rotation perpendicular to the axis of rotation of said first gimbal means; and
said rotatable shaft has an axis of rotation parallel to the axis of rotation of said second gimbal means; and
said third gimbal means has an axis of rotation perpendicular to the axis of rotation of said rotatable shaft.

38. A sensor system as in claim 37 wherein:
said first motor means is mounted on said drill string segment and is drivingly connected to said first gimbal means;
said second motor means is mounted on said first gimbal means and is drivingly connected to said second gimbal means and to said rotatable shaft; and
said third motor means is mounted on said first gimbal means and is drivingly connected to said third gimbal means.

39. A sensor system as in claim 8 wherein:

said first motor means is mounted on said drill string segment and is drivingly connected to said first gimbal means;

said second motor means is mounted on said first gimbal means and is drivingly connected to said second gimbal means; and said third motor means is mounted on said first gimbal means and is drivingly connected to said third gimbal means.

40. A sensor system as in claim 39 including:

a rotatable support means for said third gimbal means; and means drivingly connecting said second motor means to said rotatable support means to coordinate the position of said magnetic responsive means with the position of said second gravity responsive means.

41. A sensor system as in claim 40 wherein:

the axis of rotation of said rotatable support means is parallel to the axis of rotation of said second gimbal means; and the axis of rotation of said rotatable support means and the axis of rotation of said second gimbal means are perpendicular to the axis of rotation of said first gimbal; and the axis of rotation of said third gimbal means is perpendicular to the axis of rotation of said rotatable support means.

42. Sensor apparatus as in claim 8 wherein:

said drill string segment is non-magnetic.

43. Sensor apparatus as in claim 42 wherein:

said sensor apparatus is contained in a non-magnetic housing mounted in said drill string segment.

44. Sensor apparatus as in claim 8 including:

means for transmitting to the surface information representative of the directional parameters determined by the sensor system.

45. Sensor apparatus as in claim 44 wherein:

said transmitting means is acoustical transmitting means for generating acoustical signals in a liquid in the drill string.

46. Sensor apparatus as in claim 1 wherein each of said first, second and third control means includes:

measuring means for measuring the net movement of the motor means associated with the control means required to drive the associated gravity or magnetic responsive means from its first position to its second position, the net movement of each of said motor means being commensurate with a directional parameter of the drill string.

47. The method of measuring directional parameters of a drill string in a borehole as in claim 26 wherein:

the step of rotating first gravity responsive means includes rotating error transducing accelerometer means having a sensitive axis with respect to the direction of gravity forces;

the step of rotating second gravity responsive means includes rotating error transducing accelerometer means having a sensitive axis with respect to the direction of gravity forces; and the step of rotating magnetic responsive means includes rotating magnetometer means having a sensitive axis with respect to the direction of the earth's magnetic field.

48. The method of measuring directional parameters of a drill string in a borehole as in claim 47 wherein:

the step of rotating first gravity responsive means includes rotating first force balance accelerometer means having a sensitive axis, the sensitive axis being aligned perpendicular to the axis of the drill string segment in the second position of said first force balance accelerometer means;

the step of rotating second gravity responsive means includes rotating second force balance accelerometer means having a sensitive axis, the sensitive axis being aligned perpendicular to the sensitive axis of the first force balance accelerometer means in the second position of each accelerometer means; and the step of rotating magnetic responsive means includes rotating fluxgate magnetometer means having a sensitive axis, the sensitive axis being aligned perpendicular to the direction of the earth's magnetic field in the second position of the magnetometer means.

49. The method of measuring directional parameters of a drill string in a borehole as in claim 26 wherein:

the step of measuring the net movement of the first gravity responsive means to determine a first directional parameter is the step of measuring the reference angle formed between a first plane containing the axis of the drill sring segment and a known reference on the drill string segment and a second plane containing the drill axis and a vertical projection of the drill axis;

the step of measuring the net movement of the second gravity responsive means to determine a second directional parameter is the step of measuring the angle of inclination of the axis of the drill string segment with respect to the vertical in a common vertical plane; and the step of measuring the net movement of the magnetic responsive means to determine a third directional parameter is the step of measuring the azimuth angle between a vertical plane which contains the horizontal projection of the axis of the drill string segment and the vertical plane containing the horizontal projection of the direction of the local terrestrial magnetic field.

50. The method of measuring directional parameters of the drill string in a borehole as in claim 49 wherein:

the step of detecting when said first gravity responsive means is at its first predetermined position includes passing a light from a light source to a photoelectric detector;

the step of detecting when said second gravity responsive means is at its first predetermined position includes passing a light from a light source to a photoelectric detector; and the step of detecting when said magnetic responsive means is at its first predetermined position includes passing a light from a light source to a photoelectric detector.

51. The method of measuring directional parameters of a drill string in a borehole as in claim 50 wherein the step of passing light from each light source to each photoelectric detector includes:

rotating apertured disc means positioned between each light source and each photoelectric detector by driving connection between the apertured disc means and the driving motor associated with the respective gravity or magnetic responsive means.

52. The method of measuring directional parameters of a drill string in a borehole as in claim 26 wherein:

the step of rotating said second gravity responsive means includes rotating said second gravity responsive means on a gimbal rotatably mounted in said first gimbal; and the step of rotating said magnetic responsive means includes rotating said magnetic responsive means on a gimbal rotatably mounted on a rotatable shaft mounted in said first gimbal.

53. The method of measuring directional parameters of a drill string in a borehole as in claim 52 wherein:
said second gimbal has an axis of rotation perpendicular to the axis of rotation of said first gimbal;
said rotatable shaft has an axis of rotation parallel to the axis of rotation of said second gimbal; and
said third gimbal has an axis of rotation perpendicular to the axis of rotation of said rotatable shaft.

54. The method of measuring directional parameters of a drill string in a borehole as in claim 26 including the step of:
transmitting to the surface information representative of the directional parameters determined by the gravity responsive means and the magnetic responsive means.

55. The method of measuring directional parameters of a drill string in a borehole as in claim 26 including the step of:
transmitting to the surface information representative of the directional parameters determined by the gravity and magnetic responsive means by generating acoustical signals in a liquid in the drill string.

56. The method of measuring directional parameters of a drill string in a borehole as in claim 19 wherein the step of measuring the net movement of each of said first and second gravity responsive means and said magnetic responsive means includes:
measuring the net movement of the driving motor associated with each of said gravity responsive means and said magnetic responsive means, the net movement of each of said driving motors being commensurate with a directional parameter of the drill string.

57. Sensor apparatus for measuring directional parameters of a drill string in a borehole, the sensor apparatus including:
first gimbal means mounted for rotation in a segment of a drill string, said first gimbal means being rotatable about the axis of the drill string segment or an axis parallel to the drill string axis;
first gravity responsive means mounted on said first gimbal means for establishing a predetermined position of said first gimbal means with respect to the direction of the force of gravity;
second gimbal means mounted for rotation in said drill string segment, said second gimbal means being rotatable about an axis perpendicular to the axis of rotation of said first gimbal;
second gravity responsive means mounted on said second gimbal means for generating inclination related signals as a function of gravity forces on said second gravity responsive means, said inclination related signals varying as a function of the alignment of said second gravity responsive means with respect to the direction of the force of gravity;
third gimbal means mounted for rotation in said drill string segment, said third gimbal means being rotatable about an axis perpendicular to an axis perpendicular to the axis of rotation of said first gimbal;
magnetic responsive means mounted on said third gimbal means for generating azimuth related signals as a function of magnetic field forces on said magnetic responsive means, said azimuth related signals varying as a function of the alignment of said magnetic responsive means with respect to the direction of the earth's magnetic field;
motor means for said second gimbal means connected to said second gimbal means for driving said second gravity responsive means to a first predetermined position and then to a second position having a predetermined alignment with respect to the direction of the force of gravity as determined by said inclination related signals;
detector means for determining when said second gravity responsive means is at its first predetermined position and generating a home signal for said second gravity responsive means;
control means for said second gimbal means for operating said second gimbal motor means, said second gimbal control means receiving said home signal for said second gravity responsive means to terminate the drive of said second gravity responsive means to the first predetermined position thereof, said second gimbal control means then driving said second gravity responsive means to said second position thereof, said second gimbal control means receiving said inclination related signals to determine when said second position has been reached, the net movement of said second gravity responsive means from said first position thereof to said second position thereof being commensurate with an inclination parameter of the drill string;
motor means for said third gimbal means connected to said third gimbal means for driving said magnetic responsive means to a first predetermined position and then to a second position having a predetermined alignment with respect to the direction of the earth's magnetic field as determined by said azimuth related signals;
detector means for determining when said magnetic responsive means is at its first predetermined position and generating a home signal for said magnetic responsive means; and
control means for said third gimbal means for operating said third gimbal motor means, said third gimbal control means receiving said home signal for said magnetic responsive means to terminate the drive of said magnetic responsive means to the first predetermined position thereof, said third gimbal control means then driving said magnetic responsive means to said second position thereof, said third gimbal control means receiving said azimuth related signals to determine when said second position has been reached, the net movement of said magnetic responsive means from said first position thereof to said second position thereof being commensurate with an azimuth parameter of the drill string.

58. Sensor apparatus as in claim 57 wherein:
said second gravity responsive means is error transducing accelerometer means having a sensitive axis with respect to the direction of gravity forces; and
said magnetic responsive means is magnetometer means having a sensitive axis with respect to the direction of the earth's magnetic field.

59. Sensor apparatus as in claim 57 wherein:

said second gravity responsive means is a force balance accelerometer; and said magnetic responsive means is a fluxgate magnetometer having its sensitive axis perpendicular to the direction of the earth's magnetic field in the second position thereof.

60. Sensor apparatus as in claim 57 wherein:

said inclination parameter is the angle of inclination of the axis of the drill string segment with respect to the vertical in a common vertical plane; and said azimuth parameter is the azimuth angle between a vertical plane which contains the horizontal projection of the axis of the drill string segment and the vertical plane containing the horizontal projection of the direction of the local terrestrial magnetic field.

61. Sensor apparatus as in claim 57 wherein each of said detector means includes:

light generating means, photoelectric receiving means, and light control means for delivering light from said light generating means to said photoelectric receiving means when the respective gravity or magnetic responsive means is in its first predetermined position.

62. Sensor apparatus as in claim 61 wherein:

said light control means includes apertured disc means positioned between said light generating means and said light receiving means, said disc means being drivingly connected to the motor means associated with the respective gravity or magnetic responsive means.

63. Sensor apparatus as in claim 57 wherein:

each of said motor means are each stepping motors.

64. Sensor apparatus as in claim 63 wherein each of said control means includes:

pulse generating means for delivering pulses to the stepping motor associated with the control means; and means for counting the net number of pulses delivered to the stepping motor to drive the associated gravity or magnetic responsive means from its first position to its second position, said net number of pulses being commensurate with the directional parameter of the drill string to be measured by the gravity or magnetic responsive means.

65. Sensor apparatus as in claim 64 wherein:

said second gravity responsive means is error transducing accelerometer means having a sensitive axis with respect to the direction of gravity forces; and said magnetic responsive means is magnetometer means having a sensitive axis with respect to the direction of the earth's magnetic field.

66. Sensor apparatus as in claim 65 wherein:

said second gravity responsive means is a force balance accelerometer having its sensitive axis perpendicular to the sensitive axis of the first force balance accelerometer in the second position of each accelerometer; and said magnetic responsive means is a fluxgate magnetometer having its sensitive axis perpendicular to the direction of the earth's magnetic field in the second position thereof.

67. Sensor apparatus as in claim 64 wherein:

said inclination parameter is the angle of inclination of the axis of the drill string segment with respect to the vertical in a common vertical plane; and said azimuth parameter is the azimuth angle between a vertical plane which contains the horizontal projection of the axis of the drill string segment and the vertical plane containing the horizontal projection of the direction of the local terrestrial magnetic field.

68. Sensor apparatus as in claim 64 wherein each of said detector means includes:

light generating means, photoelectric receiving means, and light control means for delivering light from said light generating means to said photoelectric receiving means when the respective gravity or magnetic responsive means is in its first predetermined position.

69. Sensor apparatus as in claim 68 wherein:

said light control means includes apertured disc means positioned between said light generating means and said light receiving means, said disc means being drivingly connected to the motor means associated with the respective gravity or magnetic responsive means.

70. Sensor apparatus as in claim 64 wherein:

said second gimbal means is rotatably mounted in said first gimbal means; and said third gimbal means is rotatably mounted on a rotatable shaft, said rotatable shaft being rotatably mounted in said first gimbal means.

71. A sensor system as in claim 70 wherein:

said second gimbal means has an axis of rotation perpendicular to the axis of rotation of said first gimbal means; and said rotatable shaft has an axis of rotation parallel to the axis of rotation of said second gimbal means; and said third gimbal means has an axis of rotation perpendicular to the axis of rotation of said rotatable shaft.

72. A sensor system as in claim 71 wherein:

said motor means for said second gimbal means is mounted on said first gimbal means and is drivingly connected to said second gimbal means and to said rotatable shaft; and said motor means for said third gimbal means is mounted on said first gimbal means and is drivingly connected to said third gimbal means.

73. A sensor system as in claim 64 wherein:

said motor means for said second gimbal means is mounted on said first gimbal means and is drivingly connected to said second gimbal means; and said motor means for said third gimbal means is mounted on said first gimbal means and is drivingly connected to said third gimbal means.

74. A sensor system as in claim 73 including:

rotatable support means for said third gimbal means; and means drivingly connecting said second motor means to said rotatable support means to coordinate the position of said magnetic responsive means with the position of said second gravity responsive means.

75. A sensor system as in claim 74 wherein:

the axis of rotation of said rotatable support means is parallel to the axis of rotation of said second gimbal means; and the axis of rotation of said rotatable support means and the axis of rotation of said second gimbal means are perpendicular to the axis of rotation of said first gimbal; and the axis of rotation of said third gimbal means is perpendicular to the axis of rotation of said rotatable support means.

76. Sensor apparatus as in claim 64 wherein:
said drill string segment is non-magnetic.

77. Sensor apparatus as in claim 76 wherein:
said sensor apparatus is contained in a non-magnetic housing mounted in said drill string segment.

78. Sensor apparatus as in claim 64 including:
means for transmitting to the surface information representative of the directional parameters determined by the sensor system.

79. Sensor apparatus as in claim 78 wherein:
said transmitting means is acoustical transmitting means for generating acoustical signals in a liquid in the drill string.

80. Sensor apparatus as in claim 57 wherein each of said control means includes:
measuring means for measuring the net movement of the motor means associated with the control means required to drive the associated gravity or magnetic responsive means from its first position to its second position, the net movement of each of said motor means being commensurate with a directional parameter of the drill string.

81. Sensor apparatus as in claim 57 wherein:
said second gimbal means is rotatably mounted in said first gimbal means; and
said third gimbal means is rotatably mounted on a rotatable shaft, said rotatable shaft being rotatably mounted in said first gimbal.

82. A sensor system as in claim 81 wherein:
said second gimbal means has an axis of rotation perpendicular to the axis of rotation of said first gimbal means; and
said rotatable shaft has an axis of rotation parallel to the axis of rotation of said second gimbal means; and
said third gimbal means has an axis of rotation perpendicular to the axis of rotation of said rotatable shaft.

83. A sensor system as in claim 82 wherein:
said motor means for said second gimbal means is mounted on said first gimbal means and is drivingly connected to said second gimbal means and to said rotatable shaft; and
said motor means for said third gimbal means is mounted on said first gimbal means and is drivingly connected to said third gimbal means.

84. A sensor system as in claim 57 wherein:
said motor means for said second gimbal means is mounted on said first gimbal means and is drivingly connected to said second gimbal means; and
said motor means for said third gimbal means is mounted on said first gimbal means and is drivingly connected to said third gimbal means.

85. A sensor system as in claim 84 including:
rotatable support means for said third gimbal means; and
means drivingly connecting said second motor means to said rotatable support means to coordinate the position of said magnetic responsive means with the position of said second gravity responsive means.

86. A sensor system as in claim 85 wherein:
the axis of rotation of said rotatable support means is parallel to the axis of rotation of said second gimbal means; and
the axis of rotation of said rotatable support means and the axis of rotation of said second gimbal means are perpendicular to the axis of rotation of said first gimbal means ia perpendicular to the axis of rotation of said rotatable support means.

87. Sensor apparatus as in claim 57 wherein:
said drill string segment is non-magnetic.

88. Sensor apparatus as in claim 87 wherein:
said sensor apparatus is contained in a non-magnetic housing mounted in said drill string segment.

89. Sensor apparatus as in claim 57 including:
means for transmitting to the surface information representative of the directional parameters determined by the sensor system.

90. Sensor apparatus as in claim 89 wherein:
said transmitting means is acoustical transmitting means for generating acoustical signals in a liquid in the drill string.

91. The method of measuring directional parameters of a drill string in a borehole, including the steps of:
rotating first gravity responsive means in a segment of the drill string to establish a predetermined position of said first gravity responsive means as a function of gravity forces on said first gravity responsive means, said first gravity responsive means being mounted on a first gimbal mounted for rotation in the drill string segment about the axis of the drill string segment or an axis parallel to the drill string axis;
rotating second gravity responsive means in said drill string segment for generating inclination related signals as a function of gravity forces on said second gravity responsive means, said second gravity responsive means being mounted for rotation on a second gimbal having an axis of rotation perpendicular to the axis of rotation of the first gimbal, said inclination related signals varying as a function of the alignment of said second gravity responsive means with rspect to the direction of the force of gravity;
rotating magnetic responsive means in said drill string segment to obtain azimuth related signals as a function of magnetic field forces on said magnetic responsive means, said magnetic responsive means being mounted on a third gimbal rotatable about an axis perpendicular to an axis perpendicular to the axis of rotation of the first gimbal, and said azimuth related signals varying as a function of the alignment of said magnetic responsive means with respect to the direction of the earth's magnetic field;
operating a driving motor connected to said second gimbal to drive said second gravity responsive means to a first predetermined position and then to a second position having a predetermined alignment with respect to the direction of the force of gravity as determined by said inclination related signals;
detecting when said second gravity responsive means is at its first predetermined position and generating a home signal for said second gravity responsive means;
terminating the drive of said second gravity responsive means to the first position thereof upon receipt of said home signal for said second gravity responsive means;

driving said second gravity responsive means to said second position after the first predetermined position thereof has been reached;

measuring the net movement of said second gravity responsive means from said first predetermined position thereof to said second position thereof to determine an inclination parameter of the drill string;

operating a driving motor connected to said third gimbal to drive said magnetic responsive means to a first predetermined position and then to a second position having a predetermined alignment with respect to the direction of the earth's magnetic field as determined by said azimuth related signals;

detecting when said magnetic responsive means is at its first predetermined position and generating a home signal for said magnetic responsive means;

terminating the drive of said magnetic responsive means to the first position thereof upon receipt of said home signal for said magnetic responsive means;

driving said magnetic responsive means to said second position after the first predetermined position thereof has been reached; and measuring the net movement of said magnetic responsive means from said first predetermined position thereof to said second position thereof to determine an azimuth parameter of the drill string.

92. The method of measuring directional parameters of a drill string in a borehole as in claim 91 wherein:

the step of rotating second gravity responsive means includes rotating error transducing accelerometer means having a sensitive axis with respect to the direction of gravity forces; and the step of rotating magnetic responsive means includes rotating magnetometer means having a sensitive axis with respect to the direction of the earth's magnetic field.

93. The method of measuring directional parameters of a drill string in a borehole as in claim 92 wherein:

the step of rotating first gravity responsive means includes rotating first force balance accelerometer means having a sensitive axis, the sensitive axis being aligned perpendicular to the axis of the drill string segment in the second position of said first force balance accelerometer means;

the step of rotating second gravity responsive means includes rotating second force balance accelerometer means having a sensitive axis, the sensitive axis being aligned perpendicular to the sensitive axis of the first force balance accelerometer means in the second position of each accelerometer means; and the step of rotating magnetic responsive means includes rotating fluxgate magnetometer means having a sensitive axis, the sensitive axis being aligned perpendicular to the direction of the earth's magnetic field in the second position of the magnetometer means.

94. The method of measuring directional parameters of a drill string in a borehole as in claim 91 wherein:

the step of measuring the net movement of the second gravity responsive means to determine an inclination related parameter is the step of measuring the angle of inclination of the axis of the drill string segment with respect to the vertical in a common vertical plane; and the step of measuring the net movement of the magnetic responsive means to determine an azimuth related parameter is the step of measuring the azimuth angle between a vertical plane which contains the horizontal projection of the axis of the drill string segment and the vertical plane containing the horizontal projection of the direction of the local terrestrial magnetic field.

95. The method of measuring directional parameters of the drill string in a borehole as in claim 91 wherein:

the step of detecting when said second gravity responsive means is at its first predetermined position includes passing a light from a light source to a photoelectric detector; and the step of detecting when said magnetic responsive means is at its first predetermined position includes passing a light from a light source to a photoelectric detector.

96. The method of measuring directional parameters of a drill string in a borehole as in claim 95 wherein the step of passing light from each light source to each photoelectric detector includes:

rotating apertured disc means positioned between each light source and each photoelectric detector by driving connection between the apertured disc means and the driving motor associated with the respective gravity or magnetic responsive means.

97. The method of measuring directional parameters of the drill string in the borehole as in claim 91 wherein:

the step of operating each driving motor includes operating stepping motors.

98. The method of measuring directional parameters of a drill string in a borehole as in claim 97 wherein the steps of measuring the net movement of each of said second gravity responsive means and said magnetic responsive means includes:

generating and delivering pulses to the stepping motor associated with said second gravity responsive means and said magnetic responsive means; and counting the net number of pulses delivered to the stepping motor to drive said second gravity responsive means or magnetic responsive means from its first predetermined position to its second predetermined position, said net number of pulses being commensurate with the directional parameter of the drill string to be measured by the gravity or magnetic responsive means.

99. The method of measuring directional parameters of a drill string in a borehole as in claim 98 wherein:

the step of rotating second gravity responsive means includes rotating error transducing accelerometer means having a sensitive axis with respect to the direction of gravity forces; and the step of rotating magnetic responsive means includes rotating magnetometer means having a sensitive axis with respect to the direction of the earth's magnetic field.

100. The method of measuring directional parameters of a drill string in a borehole as in claim 99 wherein:

the step of rotating first gravity responsive means includes rotating first force balance accelerometer means having a sensitive axis, the sensitive axis being aligned perpendicular to the axis of the drill string segment in the second position of said first force balance accelerometer means;

the step of rotating second gravity responsive means includes rotating second force balance accelerometer means having a sensitive axis, the sensitive axis being aligned perpendicular to the sensitive axis of the first force balance accelerometer means in the second position of each accelerometer means; and the step of rotating magnetic responsive means includes rotating fluxgate magnetometer means having a sensitive axis, the sensitive axis being aligned perpendicular to the direction of the earth's magnetic field in the second position of the magnetometer means.

101. The method of measuring directional parameters of a drill string in a borehole as in claim 98 wherein:

the step of measuring the net movement of the first gravity responsive means to determine a first directional parameter is the step of measuring the reference angle formed between a first plane containing the axis of the drill string segment and a known reference on the drill string segment and a second plane containing the drill axis and a vertical projection of the drill axis;

the step of measuring the net movement of the second gravity responsive means to determine a second directional parameter is the step of measuring the angle of inclination of the axis of the drill string segment with respect to the vertical in a common vertical plane; and the step of measuring the net movement of the magnetic responsive means to determine a third directional parameter is the step of measuring the azimuth angle between a vertical plane which contains the horizontal projection of the axis of the drill string segment and the vertical plane containing the horizontal projection of the direction of the local terrestrial magnetic field.

102. The method of measuring directional parameters of the drill string in a borehole as in claim 101 wherein:

the step of detecting when said second gravity responsive means is at its first predetermined position includes passing a light from a light source to a photoelectric detector; and the step of detecting when said magnetic responsive means is at its first predetermined position includes passing a light from a light source to a photoelectric detector.

103. The method of measuring directional parameters of a drill string in a borehole as in claim 102 wherein the step of passing light from each light source to each photoelectric detector includes:

rotating apertured disc means positioned between each light source and each photoelectric detector by driving connection between the apertured disc means and the driving motor associated with the respective gravity or magnetic responsive means.

104. The method of measuring directional parameters of a drill string in a borehole as in claim 98 wherein:

The step of rotating said second gravity responsive means includes rotating said second gravity responsive means on a gimbal rotatably mounted in said first gimbal; and the step of rotating said magnetic responsive means includes rotating said magnetic responsive means on a gimbal rotatably mounted on a rotatable shaft mounted in said first gimbal.

105. The method of measuring directional parameters of a drill string in a borehole as in claim 104 wherein:

said second gimbal has an axis of rotation perpendicular to the axis of rotation of said first gimbal;

said rotatable shaft has an axis of rotation parallel to the axis of rotation of said second gimbal; and said third gimbal has an axis of rotation perpendicular to the axis of rotation of said rotatable shaft.

106. The method of measuring directional parameters of a drill string in a borehole as in claim 98 including the step of:

transmitting to the surface information representative of the directional parameters determined by the gravity responsive means and the magnetic responsive means.

107. The method of measuring directional parameters of a drill string in a borehole as in claim 98 including the step of:

transmitting to the surface information representative of the directional parameters determined by the gravity and magnetic responsive means by generating acoustical signals in a liquid in the drill string.

108. The method of measuring directional parameters of a drill string in a borehole as in claim 91 wherein the step of measuring the net movement of each of said second gravity responsive means and said magnetic responsive means includes:

measuring the net movement of the driving motor associated with each of said gravity responsive means and said magnetic responsive means, the net movement of each of said driving motors being commensurate with a directional parameter of the drill string.

109. The method of measuring directional parameters of a drill string in a borehole as in claim 91 wherein:

the step of rotating said second gravity responsive means includes rotating said second gravity responsive means on a gimbal rotatably mounted in said first gimbal; and the step of rotating said magnetic responsive means includes rotating said magnetic responsive means on a gimbal rotatably mounted on a rotatable shaft mounted in said first gimbal.

110. The method of measuring directional parameters of a drill string in a borehole as in claim 109 wherein:

said second gimbal has an axis of rotation perpendicular to the axis of rotation of said first gimbal;

said rotatable shaft has an axis of rotation parallel to the axis of rotation of said second gimbal; and said third gimbal has an axis of rotation perpendicular to the axis of rotation of said rotatable shaft.

111. The method of measuring directional parameters of a drill string in a borehole as in claim 91 including the step of:

transmitting to the surface information representative of the directional parameters determined by the gravity responsive means and the magnetic responsive means.

112. The method of measuring directional parameters of a drill string in a borehole as in claim 91 including the step of:

transmitting to the surface information representative of the directional parameters determined by the gravity and magnetic responsive means by generating acoustical signals in a liquid in the drill string.

* * * * *

UNITED STATES PATENT AND TRADEMARK OFFICE
CERTIFICATE OF CORRECTION

PATENT NO. : 4,021,774

DATED : May 3, 1977

INVENTOR(S) : Donald S. Grosso and Einar Asmundsson

It is certified that error appears in the above-identified patent and that said Letters Patent are hereby corrected as shown below:

Column 4, line 44, change "23" to --20--

Column 4, line 62, change "part" to --parts--

Column 13, line 9, change "forazimuth" to --for azimuth--

Column 14, line 3, change "pules" to --pulses--

Column 15, line 10, change "contracted" to --contacted--

Column 15, line 68, change "a stable" to --astable--

Column 19, line 11, after "278" insert --and 266 --.

Column 26, line 11, (Claim 1, line 103) omit "first"

Column 34, line 23, (Claim 49, line 7), change "sring" to --string--

Column 40, line 4, (Claim 86, line 8) delete "ia" and insert -- ; and--
then paragraph
then before "perpendicular" insert --the axis of rotation of said third gimbal means is--

Column 40, line 40, (Claim 91, line 21) change "rspect" to --respect--

UNITED STATES PATENT OFFICE
CERTIFICATE OF CORRECTION

Patent No. 4,021,774   Dated May 3, 1977

Inventor(s)   Donald S. Grosso et al.

It is certified that error appears in the above-identified patent and that said Letters Patent are hereby corrected as shown below:

Column 43, line 61, (Claim 104, line 4) change "The" to

-- the --.

Signed and Sealed this twenty-third Day of August 1977

[SEAL]

Attest:

RUTH C. MASON
Attesting Officer

C. MARSHALL DANN
Commissioner of Patents and Trademarks